(12) United States Patent
Angacian et al.

(10) Patent No.: US 12,467,055 B2
(45) Date of Patent: Nov. 11, 2025

(54) DELIVERY OF BIOLOGICAL MOLECULES TO PLANT CELLS

(71) Applicant: INARI AGRICULTURE TECHNOLOGY, INC., Cambridge, MA (US)

(72) Inventors: Kacey Leigh Angacian, Medford, MA (US); Michelle Ming Yu Heeney, Hopkinton, MA (US); John Paul Issa, Medford, MA (US); Adam Patrick Joyce, Stow, MA (US)

(73) Assignee: INARI AGRICULTURE TECHNOLOGY, INC., Cambridge, MA (US)

( * ) Notice: Subject to any disclaimer, the term of this patent is extended or adjusted under 35 U.S.C. 154(b) by 290 days.

(21) Appl. No.: 17/758,250

(22) PCT Filed: Dec. 29, 2020

(86) PCT No.: PCT/US2020/067255
§ 371 (c)(1),
(2) Date: Jun. 30, 2022

(87) PCT Pub. No.: WO2021/138288
PCT Pub. Date: Jul. 8, 2021

(65) Prior Publication Data
US 2023/0022635 A1  Jan. 26, 2023

Related U.S. Application Data

(60) Provisional application No. 62/955,700, filed on Dec. 31, 2019.

(51) Int. Cl.
*C12N 15/82* (2006.01)
*C12N 9/22* (2006.01)
*C12N 15/11* (2006.01)

(52) U.S. Cl.
CPC .......... *C12N 15/8206* (2013.01); *C12N 9/22* (2013.01); *C12N 15/11* (2013.01); *C12N 15/8213* (2013.01); *C12N 2310/20* (2017.05)

(58) Field of Classification Search
None
See application file for complete search history.

(56) References Cited

U.S. PATENT DOCUMENTS

| | | | |
|---|---|---|---|
| 6,743,779 B1 * | 6/2004 | Unger | A61K 9/127 435/325 |
| 9,556,449 B2 | 1/2017 | Basu et al. | |
| 2018/0119121 A1 | 5/2018 | Brouns et al. | |
| 2019/0352655 A1 | 11/2019 | Niu et al. | |
| 2021/0196632 A1 * | 7/2021 | Van Rooijen | A61K 9/127 |

FOREIGN PATENT DOCUMENTS

| | | |
|---|---|---|
| WO | 2001032907 A1 | 5/2001 |
| WO | 2018201161 A1 | 11/2018 |
| WO | 2019144124 A1 | 7/2019 |
| WO | 2020077159 A1 | 4/2020 |

OTHER PUBLICATIONS

Ying et al, 2011, Agricultural Sciences in China, 10:820-826.*
Lee et al, 2016, Adv. Mater., 1-6.*
Conrad et al, 1999, J. Phys. Chem., 103:4049-4055.*
Ma et al, 2016, Molecular Plant, 9:961-974.*
Mao et al, 2017, Cell. Mol. Life Sci., 6:1075-1093.*
Liu et al, 2014, Environ Sci Pollut Res, 21:3936-3945.*
Chen et al, 2018, Green Chemistry, 20:4169-4200.*
Pepper et al, 2017, Frontiers in Molecular Biosciences, 4:1-11.*
Lei et al, 2017, Chemical Reviews, 117:1-3.*
International Search Report and Written Opinion in PCT/US20/67255, mailed Apr. 30, 2021, 18 pages.
Invitation to Pay Additional Fees in PCT/US20/67255, mailed Mar. 9, 2021, 2 pages.
LV et al., "Fluorination on polyethlenimine allows efficient 2D and 3D cell culture gene delivery," Journal of Materials Chemistry B, 2015, vol. 3, pp. 642-650.
PubChem CID 2782436, "3-Ethoxyperfluoro(2-methylhexane)," created Jul. 19, 2005, modified Apr. 17, 2021, 21 pages.
Zhang et al., "The fluorination effect of fluoroamphiphiles in cytosolic protein delivery," Nature Communications, 2018, vol. 9, Article No. 1377, 8 pages.
Zhigang Lei, et al., "Ionic Liquids", Chemical Reviews, DOI: 10.1021/acs.chemrev.7b00246, vol. 117, 3 pages, May 24, 2017.

\* cited by examiner

*Primary Examiner* — Jason Deveau Rosen
(74) *Attorney, Agent, or Firm* — McKee, Voorhees & Sease, PLC

(57) ABSTRACT

Provided herein is a method of delivering a biological material, including a genome-editing agent, to the interior of a plant cell wherein the method includes contacting the plant cell with a complex comprising the biological material and a fluorous agent. Also provided herein are compositions and reagents for practicing the method.

21 Claims, No Drawings

DELIVERY OF BIOLOGICAL MOLECULES TO PLANT CELLS

CROSS-REFERENCE TO RELATED APPLICATIONS

This PCT application claims the benefit of U.S. Provisional Appl. No. 62/955,700, filed on Dec. 31, 2019, which is incorporated herein in its entirety.

FIELD

Aspects of this disclosure relate to biotechnology, in particular compositions and methods for plant transformation.

BACKGROUND

Plant transformation methods have been used to produce transgenic plants, i.e., plants modified to contain a transgene, for several decades. More recently, genome-editing methods (e.g., using nucleases such as zinc-finger nucleases (ZFNs), transcription activator-like effector nucleases (TAL-effector nucleases or TALENs), and RNA-guided nucleases such as CRISPR Cas nucleases) not requiring introduction of a transgene into a plant genome have been developed. Genome-editing agents can be provided to a plant cell by transformation with polynucleotides (e.g., polynucleotides encoding sequence-specific nucleases) or by direct delivery into the plant cell of the genome-editing agent(s) (e.g., a ribonucleoprotein including an RNA-guided sequence-specific nuclease and a guide RNA).

Protocols for delivery of biological molecules to plant cells that have been used with varying degrees of success include microinjection, electroporation, and biolistics; these have various disadvantages in that these techniques can be cumbersome (e.g., microinjection), work best in protoplasts (e.g., electroporation), or generally require tissue culture through callus (e.g., biolistics). Some plant transformation approaches utilize the natural ability of certain viruses (or viral-derived sequences such as replicons, see, e.g., Baltses et al. (2014), *Plant Cell,* 26:151-163) or bacteria to transfer genetic material into a plant cell. However, both virally mediated and bacterially mediated transformation techniques may face regulatory hurdles. *Agrobacterium tumefaciens*-mediated transformation, the most commonly used bacterially mediated technique (see, e.g., Bourras et al. (2015) *Phytopathol.,* 105:1288-1301), is limited to the transfer of DNA, results in the integration of bacterially derived "T-DNA" sequences in the plant cell's genome, generally requires tissue culture through callus, and has been useful only with certain plant species or even varieties or germplasm within a given species. Furthermore, all of these existing delivery or transformation methods typically require subjecting the transformed plant material or explants to tissue culture through a dedifferentiated callus phase, and often involve selection with an antibiotic or herbicide (thus requiring the corresponding antibiotic or herbicide resistance transgene to be incorporated into the transformed plant). See, e.g., Gordon-Kamm et al. (1990) *Plant Cell,* 2:603-618. Transformed plants that contain an introduced transgene for such selection are generally subject to stringent regulatory requirements. Removal of such an introduced transgene generally requires at least one crossing or backcrossing step, which itself can introduce unwanted genomic changes in the resulting progeny plants.

Plant tissue culture as used in the production of transformed plants results in significant changes (typically a decrease) in genome methylation status and heritable epigenome changes in the resulting transformed plants; this may lead to unintended phenotypic changes or unwanted somaclonal variation in the resulting transformed plants. See, e.g., Stroud et al. (2013) eLife 2:e00354; DOI:10.7554/eLife.00354; Stelpflug et al. (2014) *Genetics,* 198:209-218. Furthermore, crop plants such as soybean are often commercially provided as "elite germplasm", or inbred lines that have been selectively bred and optimized for a given growing condition or region; not all germplasm or inbred lines are equally amenable to transformation using tissue culture.

For at least the above reasons, methods of delivering biological materials, such as transformation agents or genome editing agents, that can be applied to various plant species, preferably without limitation to specific genotypes, and that do not require use of selection or tissue culture through a callus stage, are advantageous.

SUMMARY

Disclosed herein are compositions and methods useful for delivering biological materials such as genome editing agents to a plant cell.

Certain methods provide for the delivering a biological material to the interior of a plant cell in which the method comprises contacting the plant cell with a complex comprising the biological material and a fluorous agent, wherein as described in further detail elsewhere herein, the fluorous agent does not consist of a perfluorocarbon. The complex comprising the biological material and the fluorous agent is provided in a liquid, in micelles, or in an emulsion. In certain embodiments, the fluorous agent is $C_9H_5F_{15}O$ (IUPAC 2-(trifluoromethyl)-3-ethoxydodecafluorohexane) and can further comprise a fluoro-surfactant comprising alternating polyethyleneglycol (PEG) and polytetrafluoroethylene (PTFE) co-block polymer at a mass ratio of at least about 1% in the $C_9H_5F_{15}O$. In certain embodiments, the fluorous agent is a fluorinated-branched polyethylenimine polymer (F-bPEI). The F-bPEI can be dissolved in water and complexed to the biological material such as at a ratio of biological material to F-bPEI of about a 1:2 to 1:8 ratio by weight of biological material:F-bPEI.

Certain methods provide for the delivering a genome-editing agent to the interior of a plant cell in which the method comprises contacting the plant cell with a complex comprising the genome-editing agent and a fluorous agent, wherein as described in further detail elsewhere herein, the fluorous agent does not consist of a perfluorocarbon. The complex comprising the genome-editing agent and the fluorous agent is provided in a liquid, in micelles, or in an emulsion. In certain embodiments, the fluorous agent is $C_9H_5F_{15}O$ (IUPAC 2-(trifluoromethyl)-3-ethoxydodecafluorohexane) and can further comprise a fluoro-surfactant comprising alternating polyethyleneglycol (PEG) and polytetrafluoroethylene (PTFE) co-block polymer at a mass ratio of at least about 1% in the $C_9H_5F_{15}O$. In certain embodiments, the fluorous agent is a fluorinated-branched polyethylenimine polymer (F-bPEI). The F-bPEI can be dissolved in water and complexed to the genome-editing agent such as at a ratio of genome-editing agent to F-bPEI of about a 1:2 to 1:8 ratio by weight of genome-editing agent:F-bPEI.

Provided for herein is a composition comprising a plant cell and a complex comprising a biological material and a fluorous agent, wherein as described in further detail elsewhere herein, the fluorous agent does not consist of a perfluorocarbon. In certain embodiments, the biological material is a genome-editing agent. In certain embodiments, the composition comprises a liquid, micelles, or an emulsion. In certain embodiments, the fluorous agent is $C_9H_5F_{15}O$ (IUPAC 2-(trifluoromethyl)-3-ethoxydodecafluorohexane) and can further comprise a fluoro-surfactant comprising alternating polyethyleneglycol (PEG) and polytetrafluoroethylene (PTFE) co-block polymer at a mass ratio of at least about 1% in the $C_9H_5F_{15}O$. In certain embodiments, the fluorous agent is a fluorinated-branched polyethylenimine polymer (F-bPEI). The F-bPEI can be dissolved in water and complexed to the biological material agent such as at a ratio of biological material to F-bPEI of about a 1:2 to 1:8 ratio by weight of biological material:F-bPEI.

Also provided for herein is a composition comprising a complex comprising a genome-editing agent and a fluorous agent, wherein as described in further detail elsewhere herein, the fluorous agent does not consist of a perfluorocarbon. In certain embodiments, the composition comprises a liquid, micelles, or an emulsion. In certain embodiments, the fluorous agent is $C_9H_5F_{15}O$ (IUPAC 2-(trifluoromethyl)-3-ethoxydodecafluorohexane) and can further comprise a fluoro-surfactant comprising alternating polyethyleneglycol (PEG) and polytetrafluoroethylene (PTFE) co-block polymer at a mass ratio of at least about 1% in the $C_9H_5F_{15}O$. In certain embodiments, the fluorous agent is a fluorinated-branched polyethylenimine polymer (F-bPEI). The F-bPEI can be dissolved in water and complexed to the genome-editing agent such as at a ratio of genome-editing agent to F-bPEI of about a 1:2 to 1:8 ratio by weight of genome-editing agent:F-bPEI.

DETAILED DESCRIPTION

Where a term is provided in the singular, the inventors also contemplate aspects described by the plural of that term.

As used herein, the terms "comprise," "comprises," "comprising," "include," "includes," and "including" can be interchanged and are to be construed as at least having the features to which they refer while not excluding any additional unspecified features.

Unless otherwise stated, nucleic acid sequences in the text of this specification are given, when read from left to right, in the 5' to 3' direction. Nucleic acid sequences may be provided as DNA or as RNA, as specified; disclosure of one necessarily defines the other, as well as necessarily defines the exact complements, as is known to one of ordinary skill in the art.

Where values are provided such as 1, 2, 3, or 4, all ranges in between these values are also contemplated whether or not explicitly stated, for example, 1 to 4, 1 to 3, 2 to 4, 3 to 4, etc. Unless otherwise stated, ranges are inclusive of the starting and ending values.

The term "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the phrase "gene editing" includes genome modification by homology-directed repair (HDR), base editing, and non-homologous end-joining (NHEJ) mechanisms. Such gene editing includes embodiments where a sequence-specific endonuclease and a donor template DNA are provided.

As used herein, an "exogenous" agent or molecule refers to any agent or molecule from an external source that is provided to or introduced into a system, composition, a eukaryotic or plant cell culture, reaction system, or a eukaryotic or plant cell. In certain embodiments, the exogenous agent (e.g., polynucleotide, protein, or compound) from the external source can be an agent that is also found in a eukaryotic or plant cell. In certain embodiments, the exogenous agent (e.g., polynucleotide, protein, or compound) from the external source can be an agent that is heterologous to the eukaryotic or plant cell.

As used herein, a "heterologous" agent or molecule refers: (i) to any agent or molecule that is not found in a wild-type, untreated, or naturally occurring composition, eukaryotic cell, or plant cell; and/or (ii) to a polynucleotide or peptide sequence located in, e.g., a genome or a vector, in a context other than that in which the sequence occurs in nature. For example, a promoter that is operably linked to a gene other than the gene that the promoter is operably linked to in nature is a heterologous promoter.

As used herein, the phrase "plant cell" can refer either a plant cell having a plant cell wall or to a plant cell protoplast lacking a plant cell wall.

As used herein, the phrase "plant cell-compatible salt" refers to a salt of a compound that can provide for uptake of the compound by a plant cell.

The term "polynucleotide" as used herein is a nucleic acid molecule containing two (2) or more nucleotide residues. Polynucleotides are generally described as single- or double-stranded. Where a polynucleotide contains double-stranded regions formed by intra- or intermolecular hybridization, the length of each double-stranded region is conveniently described in terms of the number of base pairs. Embodiments of the systems, methods, and compositions provided herein can employ or include: (i) one or more polynucleotides of 2 to 25 residues in length, one or more polynucleotides of more than 26 residues in length, or a mixture of both. Polynucleotides can comprise single- or double-stranded RNA, single- or double-stranded DNA, double-stranded DNA/RNA hybrids, chemically modified analogues thereof, or a mixture thereof. In certain embodiments, a polynucleotide can include a combination of ribonucleotides and deoxyribonucleotides (e.g., synthetic polynucleotides consisting mainly of ribonucleotides but with one or more terminal deoxyribonucleotides or synthetic polynucleotides consisting mainly of deoxyribonucleotides but with one or more terminal dideoxyribonucleotides), or can include non-canonical nucleotides such as inosine, thiouridine, or pseudouridine. In certain embodiments, the polynucleotide includes chemically modified nucleotides (see, e.g., Verma and Eckstein (1998) Annu. Rev. Biochem., 67:99-134). Chemically modified nucleotides that can be used in the polynucleotides provided herein include: (i) phosphorothioate, phosphorodithioate, or methylphosphonate internucleotide linkage modifications of the phosphodiester backbone; (ii) nucleosides comprising modified bases and/or modified sugars; and/or (iii) detectable labels including a fluorescent moiety (e.g., fluorescein or rhodamine or a fluorescence resonance energy transfer or FRET pair of chromophore labels) or other label (e.g., biotin or an isotope). Polynucleotides provided or used herein also include modified nucleic acids, particularly modified RNAs, which are disclosed in U.S. Pat. No. 9,464,124, which is incorporated herein by reference in its entirety.

"CRISPR (Clustered Regularly Interspaced Short Palindromic Repeats)/Cas (CRISPR-associated) systems," or CRISPR systems, are adaptive defence systems originally discovered in bacteria and archaea. CRISPR systems use RNA-guided nucleases termed CRISPR-associated or "Cas" endonucleases (e.g., Cas9 or Cas12a ("Cpf1")) to cleave foreign DNA. In a typical CRISPR/Cas system, a Cas endonuclease is directed to a target nucleotide sequence (e.g., a site in the genome that is to be sequence-edited) by sequence-specific, non-coding "guide RNAs" that target single- or double-stranded DNA sequences.

CRISPR-type genome editing has value in various aspects of agriculture research and development. CRISPR elements, e.g., CRISPR endonucleases and CRISPR single-guide RNAs, are useful in effecting genome editing without remnants of the CRISPR elements or selective genetic markers occurring in progeny. Alternatively, genome-inserted CRISPR elements are useful in plant lines adapted for multiplex genetic screening and breeding. For instance, a plant species can be created to express one or more of a CRISPR endonuclease such as a Cas12a-type endonuclease or combinations with unique PAM recognition sites. Introduction of one or more of a wide variety of CRISPR guide RNAs that interact with CRISPR endonucleases integrated into a plant genome or otherwise provided to a plant is useful for genetic editing for providing desired phenotypes or traits, for trait screening, or for trait introgression. Multiple endonucleases can be provided in expression cassettes with the appropriate promoters to allow multiple genome editing in a spatially or temporally separated fashion in either in chromosome DNA or episome DNA.

CRISPR technology for editing the genes of eukaryotes is disclosed in US Patent Application Publications 2016/0138008A1 and US2015/0344912A1, and in U.S. Pat. Nos. 8,697,359, 8,771,945, 8,945,839, 8,999,641, 8,993,233, 8,895,308, 8,865,406, 8,889,418, 8,871,445, 8,889,356, 8,932,814, 8,795,965, and 8,906,616. Cas12a (Cpf1) endonuclease and corresponding guide RNAs and PAM sites are disclosed in U.S. Pat. No. 9,790,490 and U.S. patent application Ser. 15/566,528 (national phase of PCT Application PCT/EP2016/058442, published as WO 2016/166340). Plant RNA promoters for expressing CRISPR guide RNA and plant codon-optimized CRISPR Cas9 endonuclease are disclosed in International Patent Application PCT/US2015/018104 (published as WO 2015/131101 and claiming priority to U.S. Provisional Patent Application 61/945,700). Methods of using CRISPR technology for genome editing in plants are disclosed in US Patent Application Publications US 2015/0082478A1 and US 2015/0059010A1 and in International Patent Application PCT/US2015/038767 A1 (published as WO 2016/007347 and claiming priority to U.S. Provisional Patent Application 62/023,246). All of the patent publications referenced in this paragraph are incorporated herein by reference in their entirety.

At least one double-stranded break (DSB) can be effected at a precisely determined site in the plant genome, for example by means of an RNA-guided nuclease and guide RNAs, and a nucleotide sequence encoded by a donor polynucleotide can then be heterologously integrated at the site of the DSB (or between two DSBs). In embodiments, the donor polynucleotide includes single-stranded DNA, optionally including chemical modifications. In other embodiments, the donor polynucleotide includes double-stranded DNA, optionally including chemical modifications. In some embodiment the donor polynucleotide includes both DNA and RNA, for example as a duplex formed by a DNA strand and an RNA strand. In embodiments, the donor polynucleotide is designed to include a template for genome editing via homology-dependent repair (HDR); the template generally includes a "core sequence" that is to replace a sequence of the genome of about the same size, as well as "homology arms" that flank the core sequence on either side and have a sequence complementary to the genomic regions flanking the genomic sequence to be replaced or edited. In other embodiments, the donor polynucleotide does not include homology arms or does not include a core sequence and homology arms, for example in embodiments where the donor polynucleotide is used to make a deletion, or is used to integrate a polynucleotide sequence by a non-homologous end joining (NHEJ) mechanism.

In general, a donor polynucleotide including a template encoding a nucleotide change over a region of less than about 50 nucleotides is conveniently provided in the form of single-stranded DNA; larger donor templates (e.g., more than 100 nucleotides) are often conveniently provided as double-stranded DNAs. Thus in some embodiments, the donor polynucleotide is about 25 nucleotides, 50 nucleotides, 60 nucleotides, 70 nucleotides 80 nucleotides, 90 nucleotides, 100 nucleotides, 200 nucleotides, 300 nucleotides, 400 nucleotides, 500 nucleotides, 600 nucleotides, 700 nucleotides, 800 nucleotides, 900 nucleotides, 1000 nucleotides, 1200 nucleotides, 1500 nucleotides, 1800 nucleotides, 2000 nucleotides, 2500 nucleotides, 3000 nucleotides, 5000 nucleotides, 10,000 nucleotides, or more (such as about 25-200 nucleotides, 50-300 nucleotides, 100-500 nucleotides, 200-800 nucleotides, 700-2000 nucleotides, 1000-2500 nucleotides, 2000-5000 nucleotides, 4000-8000 nucleotides, or 6000-10,000 nucleotides).

For the purposes of this disclosure, a "fluorous agent" for forming a complex with a biological material does not consist solely of a perfluorocarbon (i.e., not e.g., perfluorodecalin, perfluoromethyldecalin, etc.); in embodiments, the "fluorous agent" does not include any perfluorocarbons. Representative examples of "fluorous agents" include hydrofluorocarbons such as variably fluorinated acyclic hydrocarbons, fluorinated ethers (e.g., methyl perfluoropropyl ether, methoxynonafluorobutane), fluorinated polymers (including fluorinated polyethylenimine), fluorinated branched hydrocarbons, and fluorinated surfactants. In embodiments, the fluorous agent includes a combination of fluorinated compounds, e.g., a combination of a fluorinated surfactant and a fluorous solvent, or a combination of different fluorinated ethers (e.g., Novec™ 7100, Sigma-Aldrich catalogue number SHH0002 or HFE-7100, Sigma-Aldrich catalogue number 464309).

Method of Delivering a Biological Material to the Interior of a Plant Cell

This disclosure provides a method of delivering a biological material to a plant cell, the method including contacting the plant cell with a complex comprising the biological material and a fluorous agent as described anywhere herein, whereby the biological material is delivered to the interior of the plant cell. In certain embodiments, the complex comprising the biological material and the fluorous agent can be provided in a liquid, in micelles, or in an emulsion.

For purposes of this disclosure, the step of: "contacting a plant cell with a complex comprising the biological material and fluorous agent," includes directly contacting the plant cell and also includes indirect contact and/or step-wise application. For example, the complex can be transported to the location of the plant cell such as by transport through a pollen tube/silk or by transport through phloem or other vascular tissue wherein the complex is not directly applied to the plant cell. Components of the biological material/ fluorous agent complex can be provided separately, e.g., for in situ formation of the complex, either directly to the plant cell or indirectly. For example, the biological material can be applied to a plant tissue (e.g., meristem tissue, embryo, ovule, pollen) containing the plant cell in a first step, followed by application of the fluorous agent to the plant tissue. In certain embodiments, the method includes combinations of delivery methods and/or materials such as delivery of biolistic particles or other nanomaterials coated or carrying the biological material along with separate application of the fluorous agent (e.g., delivery of a nuclease via biolistics and a guide RNA via fluorous complex). In certain embodiments, the application of the fluorous agent can either precede or follow delivery of the biolistic particles or other nanomaterials coated or carrying the biological material.

In certain embodiments, the fluorous agent is a fluorous solvent. In certain embodiments, the complex further comprises a fluoro-surfactant comprising alternating polyethyleneglycol (PEG) and polytetrafluoroethylene (PTFE) co-block polymer at a mass ratio of at least about 1% in the fluorous solvent. A commercially available example of such a fluoro-surfactant is obtained from RAN Biotechnologies as product #FS008. A mass ratio of 1% in the fluorous solvent is termed the critical micelle concentration (CMC). It is contemplated that this ratio ensures that the biological cargo is encapsulated in the non-aqueous micelles. In certain embodiments, the fluorous solvent is $C_9H_5F_{15}O$ (IUPAC 2-(trifluoromethyl)-3-ethoxydodecafluorohexane). In certain embodiments, the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$. A commercially available example of such a fluoro-surfactant is obtained from RAN Biotechnologies as product #FS008. A mass ratio of 1% in the $C_9H_5F_{15}O$ is termed the critical micelle concentration (CMC). It is contemplated that this ratio ensures that the biological cargo is encapsulated in the non-aqueous micelles. In certain embodiments, the fluorous agent comprises a fluoroamphiphile such as a fluorinated-branched polyethylenimine polymer (F-bPEI). For example, in certain embodiments, a branched polyethylenimine (bPEI) has an average molecular weight of ~25,000 g/mol and is labelled with 3-Perfluorohexyl-1,2-epoxypropane as the fluorinating agent, however, it is contemplated to use branched PEIs of varying molecular weight as well as fluorinating agents of varying lengths such as described, for example, in Zhang et al. (2018) Nat. Comm., 9:1377, pp. 1-8. Representative examples of preparing the fluorous agent can be found in the Examples. In certain embodiments, the fluorous agent is dissolved in water and then complexed with the biological material. Once formed, the complex can then be diluted further into a larger reaction volume for use. In certain embodiments, the ratio of the biological material and the fluorous agent (e.g., F-bPEI) is about a 1:2, 1:3, 1:4, 1:5, 1:6, 1:7, or 1:8 ratio by weight of biological material:fluorous agent, or any range of 1:2 to 1:8 ratio by weight of biological material:fluorous agent. Ranges of biological material:fluorous agent that can be used include about a 1:2, 1:3 or 1:5 to about 1:6, 1:7, or 1:8 ratio by weight of biological material:fluorous agent. For example, in certain embodiments, the ratio of the biological material and F-bPEI is about a 1:2, 1:3, 1:4, 1:5, 1:6, 1:7, or 1:8 ratio by weight of biological material:F-bPEI, or any range of 1:2 to 1:8 ratio by weight of biological material: F-bPEI. Ranges of biological material:F-bPEI that can be used include about a 1:2, 1:3 or 1:5 to about 1:6, 1:7, or 1:8 ratio by weight of biological material:F-bPEI.

The biological material can be any of numerous biological molecules including, but not limited to, a bacterial or viral transformation vector (e.g., *Agrobacterium* or other bacteria), an oligopeptide, polypeptide, or protein, a nucleic acid such as an oligonucleotide or polynucleotide, and combinations thereof In certain embodiments, the biological material is a naturally occurring biological material (e.g., a polypeptide isolated from a natural source), or is a recombinantly produced biological material (e.g., a ribonucleoprotein including a recombinantly produced Cas nuclease and a recombinantly produced guide RNA), or is a chemically modified biological material (e.g., a sequence-specific nuclease labelled with a fluorophore or other detectable label). Embodiments of the method are useful for delivering polynucleotides, polypeptides, or combinations of both polynucleotides and polypeptides to the interior or a plant cell. In embodiments, the biological material is a macromolecule, such as a protein, a complex of proteins covalently or non-covalently associated with each other, or a ribonucleoprotein. Generally, the biological material does not include an intact virus or viroid. Embodiments of the method are particularly useful for effecting non-random genomic modification of plant cells include delivery of sequence-specific genome editing agents, such as sequence-specific nucleases (e.g., Cas nucleases) or polynucleotides encoding such nucleases, or ribonucleoproteins including a sequence-specific nuclease, to the interior of a plant cell. See also the paragraphs captioned "Genome-Editing Agents" in the "Related Disclosure" section of this disclosure. In some embodiments the method is useful for delivering polynucleotides encoding sequence-specific genome editing agents, such as DNA encoding base editors or DNA encoding Cas nucleases and associated guide RNAs and donor polynucleotides. In embodiments, the biological material includes a polynucleotide (e.g., DNA, RNA, or a combination of DNA and RNA), which can be isolated from a natural source, or synthetically produced; such polynucleotides can be chemically or biochemically modified, e.g., to improve stability or solubility. In embodiments, the biological material includes a polypeptide (such as a sequence-specific nuclease) having a sequence that is codon-optimized for the plant (dicot or monocot), as is best suited. In embodiments, the biological material consists essentially of one or more polynucleotides but includes no protein. In other embodiment, the biological material includes a polypeptide (e.g., a sequence-specific nuclease, a reporter protein such as a fluorescent protein) or a ribonucleoprotein (e.g., a Cas nuclease and its associated guide RNA and optional donor polynucleotide); such polypeptides can be chemically or biochemically modified, e.g., to incorporate a fluorescent label, a nuclear localization signal (NLS), or a cell-penetrating peptide (CPP). In embodiments, the biological material includes a sequence-specific genome editing agent, such as at least one genome editing agent selected from the group consisting of a sequence-specific nuclease, a ribonucleoprotein including a Cas nuclease and its associated guide RNA, a guide RNA, and a donor polynucleotide; or one or more polynucleotides encoding such. In embodiments, the biological material includes a sequence-specific genome editing agent, such as a deactivated sequence-specific nuclease (e.g., a "dead" Cas nuclease), which can be complexed with other polypeptides (e.g., polypeptides including a functional domain) or with polynucleotides or with both. In embodiments, the biological material is small in size (e.g., less than 10 nanometers in diameter for a globular protein), relative to viruses.

Thus, in certain embodiments, the biological material comprises: a polynucleotide including siRNAs, miRNAs, and other "oligonucleotides"; a polypeptide including smaller peptides; and a small molecule, or a combination of any thereof. In certain embodiments, the polynucleotide is a guide RNA (gRNA) or a polynucleotide encoding a gRNA. In certain embodiments, the biological material comprises a polypeptide or a ribonucleoprotein which can include at least one sequence-specific nuclease or a polynucleotide encoding a sequence-specific nuclease. For purposes of this disclosure, a small molecule" has a MWt~≤1,000 Da (having a molecular weight of less than about 1,000 Da) and is charged in certain embodiments(e.g., "Evan's blue" dye (961 Da) or sodium fluorescein dye (NaF; 376 Da) are commonly used inert tracers in blood-brain barrier (BBB) research and are both highly charged low molecular weight (LMW) tracers). In certain embodiments, the biological material comprises a sequence-specific genome-editing agent, such as a sequence-specific nuclease, a polynucleotide encoding a sequence-specific nuclease, a guide RNA (gRNA), a polynucleotide encoding a gRNA, and/or a ribonucleoprotein including at least one sequence-specific nuclease. Thus, in certain embodiments, the method of delivering a biological material to the interior of a plant cell can result in a non-random genomic modification of the plant cell.

In certain embodiments, the plant cell to which the biological material is delivered by the method is in a plant tissue. In certain embodiments, the plant cell comprises a cell wall. In certain embodiments, the plant cell is a protoplast. In certain embodiments, the plant cell is in a liquid suspension. The plant tissue can be from many different parts of the plant including, but not limited to, being selected from the group consisting of an intact nodal bud, a shoot apex or shoot apical meristem, a root apex or root apical meristem, lateral meristem, intercalary meristem, a seedling, leaf tissue, a whole seed, a halved seed or other seed fragment, an embryo or embryonic tissue, an anther, a stigma, a style, an ovule, an ovary, callus, and a pollen grain. In certain embodiments, the plant tissue is selected from the group consisting of leaf tissue, a whole seed, a halved seed or other seed fragment, an embryo or embryonic tissue, and a pollen grain. In certain embodiments, the plant cell is located in a pollen grain, for example, in certain embodiments the plant cell is located in a pre-anthesis-stage pollen grain, e.g., a pre-anthesis dicot pollen grain. In certain embodiments the plant cell is a cell of a haploid inducer plant and in certain embodiments the plant cell can be a cell in a pollen grain of a haploid inducer plant. In certain embodiments, the plant cell is a generative cell or a tube cell located in a pollen grain and the method comprises germinating the pollen grain. In certain embodiments, the plant cell is a generative cell or a tube cell located in a pollen grain and the method comprises germinating the pollen grain and contacting the resulting pollen tube with a stigma, stigma style, ovary, or ovum of a maternal plant, thereby resulting in fertilization of an egg of the maternal plant. And, in certain embodiments, the biological material comprises a sequence-specific genome editing agent, the zygote produced by the fertilization comprises a non-random modification in its genome, and the non-random genomic modification is effected by the sequence-specific genome editing agent.

In certain embodiments, the plant cell, a tissue containing the plant cell, and/or the complex comprising the biological material and the fluorous agent is provided in a composition comprising an adjuvant such as, but not limited to, an adjuvant selected from the group consisting of divalent cations and polyamines. In certain embodiments, the divalent cation can be, for example, $Ca^{2+}$ or $Mg^{2+}$. In certain embodiments, the polyamine can be, for example, spermine, spermidine, or putrescine. In certain embodiments, the plant cell, a tissue containing the plant cell, and/or the complex comprising the biological material and the fluorous agent is provided in a composition comprising exogenous non-specific DNA (e. g., non-specific double-stranded DNA, non-specific single-stranded DNA, commercially available sheared salmon sperm DNA).

In certain embodiments, the plant cell and/or the plant tissue comprising the plant cell is treated before, during, and/or after contact with the complex comprising the biological material and the fluorous agent with a chemical, mechanical, and/or enzymatic treatment. Examples of such treatments include but are not limited to sonication, biolistics, treatment with micro- or nano-particles such as gold nanoparticles used for biolistics, microneedles, nanoneedles, carbon nanotubes, mesoporous silica nanoparticles, and quantum dots, and/or enzymes or chemicals such as surfactants, solvents, and chelating agents, including those that affect plant cell wall integrity (e.g., cellulase, EDTA, EGTA), abrasive treatments, heating, chilling, or combinations of any of the preceding. In certain embodiments, prior to contacting the plant cell with the complex comprising the biological material and the fluorous agent, the plant cell and/or the plant tissue comprising the plant cell, is pre-treated with such a surfactant, enzyme, abrasive, solvent, chelating agent, or a combination thereof. In certain embodiments, the plant cell and/or the plant tissue comprising the plant cell is pre-treated with an ionic liquid before contacting the plant cell with the complex comprising the biological material and the fluorous agent. It has been discovered, for example, that where the biological material is a genome-editing agent, pre-treatment with the ionic liquid increases the efficiency of genome editing in comparison to a control without pre-treatment with the ionic liquid. In certain embodiments, the pre-treatment with the ionic liquid is for a duration of time of about 0.5 seconds to 5 minutes, about 0.5 seconds to 10 minutes, 1 second to 5 minutes, 1 second to 10 minutes, 5 seconds to 5 minutes, 5 seconds to 10 minutes, 10 seconds to 5 minutes, 10 seconds to 10 minutes, 0.5 minutes to 5 minutes, or 0.5 minutes to 10 minutes. In certain embodiments, the pre-treatment with the ionic liquid is for a duration of time of about 0.5, 1, 2, 5, or 10 seconds to about 1, 2, 5, or 10 minutes. Further, the plant cell and/or the plant tissue comprising the plant cell is pre-treated in a composition comprising an amount of up to about the upper limit of saturation of the ionic liquid (about 50% by volume of the ionic liquid), e.g., about >0% to 50% by volume of the ionic liquid, of about >0% to 25% by volume of the ionic liquid, of about 5% to 50% by volume of the ionic liquid, of about 5% to 25% by volume of the ionic liquid, of about 10% to 50% by volume of the ionic liquid, of about 10% to 25% by volume of the ionic liquid, of about 15% to 50% by volume of the ionic liquid, of about 15% to 25% by volume of the ionic liquid, or of about 15% to 20% by volume of the ionic liquid. In certain embodiments, the ionic liquid comprises tetrabutylammonium acetate (TBAA), which can be in or provided in dimethyl sulfoxide (DMSO). In certain embodiments, prior to contacting the plant cell with the complex comprising the biological material and the fluorous agent, the complex comprising the biological material and the fluorous agent is stabilized with a stabilization compound. For example, in certain embodiments, the stabilization compound can be a polysaccharide, a polyol, and/or a polyalcohol including, for example, glycols, dextrans, levans, and polyethyleneglycols, and/or sugars, such as mono-, di-, and trisaccharides (e.g., glycerol, erythritol, arabitol, sorbitol, mannitol, xylitol, mannisdomannitol, glucosylglycerol, glucose, fructose, sucrose, trehalose, isofluoroside, raffinose). In certain embodiments, the polysaccharide is a disaccharide such as, but not limited to, alpha, alpha-trehalose. The addition of a stabilization compound can be combined with lyophilisation of the complex comprising the biological material and the fluorous agent, for example to stabilize/store the complex prior to contact with the plant. Thus, certain embodiments provide for combinations of one or more of fluorous agents (e.g., fluorous surfactants, fluorous solvents, fluoroamphiphiles); biological materials; ionic liquids; and stabilization compounds (e.g., trehalose) in a composition or for use in a method of this disclosure.

As noted and in furtherance of the above description, in certain embodiments, the plant cell is a cell of a dicot plant. In other embodiments, the plant cell is a cell of a monocot plant. In embodiments, the plant cell is located in a plant tissue, such as in at least one plant tissue selected from the group consisting of an intact nodal bud, a shoot apex or shoot apical meristem, a root apex or root apical meristem, lateral meristem, intercalary meristem, a seedling (e. g., a germinating seed or small seedling or a larger seedling with one or more true leaves), leaf tissue, a whole seed (e. g., an intact seed, or a seed with part or all of its seed coat removed or treated to make permeable), a halved seed or other seed fragment, an embryo (e. g., a mature dissected zygotic embryo, a developing embryo, a dry or rehydrated or freshly excised embryo) or embryonic tissue, an anther, a stigma, a style, an ovule, an ovary, and callus. In embodiments, the plant cell is in pollen (i.e., in a pollen grain). In embodiments, the plant cell is in a pre-hydrated pollen grain. In embodiments, the plant cell is located in a pre-anthesis pollen grain. In embodiments, the plant cell is located in a pre-anthesis-stage dicot pollen grain. In embodiments, the plant cell is haploid. In embodiments, the plant cell is a cell of a haploid inducer plant, such as a cell in a pollen grain of a haploid inducer plant. The method can also be used with individual plant cells (i.e., not in a tissue), such as plant cells in suspension (e.g., cultured plant cells in liquid medium) or fixed onto a solid surface or matrix. In embodiments, the plant cell, or a tissue containing the plant cell, is provided in a composition including exogenous non-specific DNA (e. g., non-specific double-stranded DNA, non-specific single-stranded DNA, commercially available sheared salmon sperm DNA). In an embodiment, the plant cell is provided in a composition including exogenous non-specific DNA at a concentration of between 0.05-1 milligrams per microliter; in an embodiment, the plant cell is provided in a composition including exogenous non-specific DNA at a concentration of between 0.1-0.5 milligrams per microliter. In an embodiment, the plant cell is in a pollen grain provided in a composition including exogenous non-specific DNA at a concentration of between 0.05-1 milligrams per microliter. In an embodiment, the plant cell is in a dicot pollen grain provided in a composition including exogenous non-specific DNA of an average size of ≤2,000 bp at a concentration of between 0.05-1 milligrams per microliter.

In certain embodiments, the plant cell includes a cell wall. In certain embodiments, the cell wall can be intact. In certain embodiments, the plant cells has not been treated by physical (e.g., sonication, abrasion, heating, or chilling), chemical (e.g., treatment with solvents or surfactants), or enzymatic treatments. In embodiments, the plant cell is in its native state, for example, a plant cell that has a cell wall that has not been treated or made porous or permeable by chemical, enzymatic, or physical means. In other embodiments, however, the plant cell or a tissue containing the plant cell, is provided in a composition further including at least one reagent, or has been pre-treated with at least one reagent, wherein the reagent can be one or more selected from the group consisting of:

(a) solvents (e. g., water, dimethylsulfoxide, dimethylformamide, acetonitrile, N-pyrrolidine, pyridine, hexamethylphosphoramide, alcohols, alkanes, alkenes, dioxanes, polyethylene glycol, and other solvents miscible or emulsifiable with water or that will dissolve phosphonucleotides in non-aqueous systems);

(b) perfluorocarbons (e.g., perfluorodecalin, perfluoromethyldecalin) and/or a fluorous agent;

(c) glycols, polysaccharides, and/or polyols (e. g., propylene glycol, polyethylene glycol);

(d) surfactants, including fluoro-surfactants (e.g., alternating polyethyleneglycol (PEG) and polytetrafluoroethylene (PTFE) co-block polymer and/or a fluorinated-branched polyethylenimine polymer (F-bPEI)), cationic surfactants, anionic surfactants, non-ionic surfactants, and amphiphilic surfactants, e. g., alkyl or aryl sulfates, phosphates, sulfonates, or carboxylates; primary, secondary, or tertiary amines; quaternary ammonium salts; sultaines, betaines; cationic lipids; phospholipids; tallowamine; bile acids such as cholic acid; saponins or glycosylated triterpenoids or glycosylated sterols (e. g., saponin commercially available as catalogue number 47036-50g-F, Sigma-Aldrich, St. Louis, Mo.); long chain alcohols; organosilicone surfactants including nonionic organosilicone surfactants such as trisiloxane ethoxylate surfactants or a silicone polyether copolymer such as a copolymer of polyalkylene oxide modified heptamethyl trisiloxane and allyloxypolypropylene glycol methylether (commercially available as SILWET L-77™ brand surfactant having CAS Number 27306-78-1 and EPA Number CAL. REG. NO. 5905-50073-AA, Momentive Performance Materials, Inc., Albany, N.Y.); specific examples of useful surfactants include sodium lauryl sulfate, the Tween series of surfactants, Triton-X100, Triton-X114, CHAPS and CHAPSO, Tergitol-type NP-40, Nonidet P-40;

(e) lipids, lipoproteins, lipopolysaccharides;

(f) acids, bases, caustic agents;

(g) peptides, proteins, or enzymes (e. g., cellulase, pectolyase, maceroenzyme, pectinase), including cell-penetrating or pore-forming peptides (e. g., (BO100)2K8, Genscript; poly-lysine, poly-arginine, or poly-homoarginine peptides; gamma zein, see US Patent Application publication 2011/0247100, incorporated herein by reference in its entirety; transcription activator of human immunodeficiency virus type 1 ("HIV-1 Tat") and other Tat proteins, see, e. g., lifetein[dot]com/Cell_Penetrating_Peptides[dot]html and Järver (2012) *Mol. Therapy—Nucleic Acids,* 1:e27,1-17); octa-arginine or nona-arginine; poly-homoarginine (see Unnamalai et al. (2004) *FEBS Letters,* 566:307-310); see also the database of cell-penetrating peptides CPPsite 2.0 publicly available at crdd[dot]osdd[dot]net/raghava/cppsite/;

(h) RNase inhibitors;

(i) cationic branched or linear polymers such as chitosan, poly-lysine, DEAE-dextran, polyvinylpyrrolidone ("PVP"), or polyethylenimine ("PEI", e. g., PEI, branched, MW 25,000, CAS #9002-98-6; PEI, linear, MW 5000, CAS #9002-98-6; PEI linear, MW 2500, CAS #9002-98-6);

(j) dendrimers (see, e. g., US Patent Application Publication 2011/0093982, incorporated herein by reference in its entirety);

(k) counter-ions, amines or polyamines (e. g., spermine, spermidine, putrescine), osmolytes, buffers, and salts (e. g., calcium phosphate, ammonium phosphate);

(l) polynucleotides (e. g., non-specific double-stranded DNA, salmon sperm DNA);

(m) transfection agents (e. g., Lipofectin®, Lipofectamine®, and Oligofectamine®, and Invivofectamine® (all from Thermo Fisher Scientific, Waltham, Mass.), PepFect (see Ezzat et al. (2011) *Nucleic Acids Res.,* 39:5284-5298), Transit® transfection reagents (Mirus Bio, LLC, Madison, Wis.), and poly-lysine, poly-homoarginine, and poly-arginine molecules including octo-arginine and nono-arginine as described in Lu et al. (2010) *J. Agric. Food Chem.,* 58:2288-2294);

(n) antibiotics, including non-specific DNA double-strand-break-inducing agents (e. g., phleomycin, bleomycin, talisomycin);

(o) antioxidants (e. g., glutathione, dithiothreitol, ascorbate); and (p) chelating agents (e. g., EDTA, EGTA).

In some embodiments, a biological material including a sequence-specific genome editing agent, such as a sequence-specific nuclease (or a polynucleotide encoding such a sequence-specific nuclease), is delivered to a plant cell located in a pollen grain, and at least one non-random genomic modification is effected by the sequence-specific genome editing agent in the plant cell. By "non-random genomic modification" is meant at least one nucleotide is inserted, deleted, or changed at a sequence-specific location within a pre-selected genomic locus. As is known in the art, the sequence-specific genome editing agent is directed to the pre-selected genomic locus by sequence-specificity, e.g., by selecting the correct guide RNA sequence to direct a Cas nuclease to the pre-selected genomic locus; the non-random genomic modification is then effected specifically at that locus. In an embodiment, a ribonucleoprotein including a Cas nuclease and guide RNA, optionally with a donor polynucleotide, is delivered to a male gamete or male reproductive cell located in a pollen grain. In embodiments, the plant cell is a generative cell or a tube cell located in a pollen grain, and the method further includes the step of germinating the pollen grain. In some embodiments, the method further includes the steps of germinating the pollen grain to form a pollen tube, and contacting the resulting pollen tube with female reproductive tissue or female gametes of a maternal plant, thereby resulting in fertilization of an egg of the maternal plant. In some embodiments, the plant cell is a generative cell located in a pollen grain, and the method further includes the steps of germinating the pollen grain to form a pollen tube and contacting the resulting pollen tube with a stigma, stigma style, ovary, or ovum of a maternal plant, thereby resulting in fertilization of an egg of the maternal plant; in certain of these embodiments, the biological material includes a sequence-specific genome editing agent that effects a non-random genomic modification in the generative cell, and the zygote produced by the fertilization includes the non-random modification in its genome. In some embodiments, the plant cell is a tube cell located in a pollen grain, and the method further includes the steps of germinating the pollen grain and contacting the resulting pollen tube with a stigma, stigma style, ovary, or ovum of a maternal plant, thereby resulting in fertilization of an egg of the maternal plant; in certain of these embodiments, the biological material includes a sequence-specific genome editing agent, and the zygote produced by the fertilization includes a non-random modification in its genome, wherein the non-random genomic modification is effected by the sequence-specific genome editing agent. Thus, a related aspect of this disclosure provides a method of producing a plant zygote including in its genome an inherited, non-random genomic modification, wherein the non-random genomic modification is inherited from a parent germinative cell that gave rise to the zygote, and wherein the non-random genomic modification was effected in the parent germinative cell by an exogenously provided sequence-specific nuclease (or a polynucleotide encoding such a sequence-specific nuclease). In embodiments, no selection (e.g., no use of antibiotics or herbicides) is employed in the method.

Related aspects of this disclosure include the plant cell into which an exogenous biological material has been delivered (e.g., a plant cell in which a genomic modification has been effected by an exogenous sequence-specific genome editing agent that was delivered using the disclosed method), as well as progeny plant cells, tissue, plants, or seeds grown from or regenerated from the plant cell. In general, the method described should result in fertile regenerated plantlets, e.g., fertile wheat plantlets or fertile maize plantlets or fertile soybean plantlets. In embodiments the method provides fertile plantlets including germline cells having at least one non-random genetic modification, in comparison to an unmodified control genome, wherein the at least one non-random genetic modification was effected by the exogenous biological material. In embodiments, the germline cells having at least one non-random genetic modification can give rise to further generations of seeds and plants that also contain the at least one genetic modification in their genome.

Method of Providing a Genome-Editing Agent to a Plant Cell

This disclosure provides a method of providing a genome-editing agent to a plant cell, the method including contacting the plant cell with a complex comprising the genome-editing agent and a fluorous agent as described anywhere herein; whereby the genome-editing agent is delivered to the interior of the plant cell. In certain embodiments, the method results in a non-random genomic modification of the plant cell. In certain embodiments, the complex comprising the genome-editing agent and the fluorous agent is provided in a liquid, in micelles, or in an emulsion.

For purposes of this disclosure, the step of: "contacting a plant cell with a complex comprising the genome-editing agent and fluorous agent," includes directly contacting the plant cell and also includes indirect contact and/or step-wise application. For example, the complex can be transported to the location of the plant cell such as by transport through a pollen tube/silk or by transport through phloem or other vascular tissue wherein the complex is not directly applied to the plant cell. Components of the genome-editing agent/fluorous agent complex can be provided separately, e.g., for in situ formation of the complex, either directly to the plant cell or indirectly. For example, the genome-editing agent can be applied to a plant tissue (e.g., meristem tissue, embryo, ovule, pollen) containing the plant cell in a first step, followed by application of the fluorous agent to the plant tissue. In certain embodiments, the method includes combinations of delivery methods and/or materials such as delivery of biolistic particles or other nanomaterials coated or carrying the genome-editing agent along with separate application of the fluorous agent (e.g., delivery of a nuclease via biolistics and a guide RNA via fluorous complex). In certain embodiments, the application of the fluorous agent can either precede or follow delivery of the biolistic particles or other nanomaterials coated or carrying the genome-editing agent.

In certain embodiments, the fluorous agent is a fluorous solvent. In certain embodiments, the complex further comprises a fluoro-surfactant comprising alternating polyethyleneglycol (PEG) and polytetrafluoroethylene (PTFE) co-block polymer at a mass ratio of at least about 1% in the fluorous solvent. A commercially available example of such a fluoro-surfactant is obtained from RAN Biotechnologies as product #FS008. A mass ratio of 1% in the fluorous solvent is termed the critical micelle concentration (CMC). It is contemplated that this ratio ensures that the biological cargo is encapsulated in the non-aqueous micelles. In certain embodiments, the fluorous solvent is $C_9H_5F_{15}O$ (IUPAC 2-(trifluoromethyl)-3-ethoxydodecafluorohexane). In certain embodiments, the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$. A commercially available example of such a fluoro-surfactant is obtained from RAN Biotechnologies as product #FS008. A mass ratio of 1% in the $C_9H_5F_{15}O$ is termed the critical micelle concentration (CMC). It is contemplated that this ratio ensures that the biological cargo is encapsulated in the non-aqueous micelles. In certain embodiments, the fluorous agent comprises a fluoroamphiphile such as a fluorinated-branched polyethylenimine polymer (F-bPEI). For example, in certain embodiments, a branched polyethylenimine (bPEI) has an average molecular weight of ~25,000 g/mol and is labelled with 3-Perfluorohexyl-1,2-epoxypropane as the fluorinating agent, however, it is contemplated to use branched PEIs of varying molecular weight as well as fluorinating agents of varying lengths such as described, for example, in Zhang et al. (2018) Nat. Comm., 9:1377, pp. 1-8. Representative examples of preparing the fluorous agent can be found in the Examples. In certain embodiments, the fluorous agent is dissolved in water and then complexed with the genome-editing agent. Once formed, the complex can then be diluted further into a larger reaction volume for use. In certain embodiments, the ratio of the genome-editing agent and the fluorous agent (e.g., F-bPEI) is about a 1:2, 1:3, 1:4, 1:5, 1:6, 1:7, or 1:8 ratio by weight of genome-editing agent:fluorous agent, or any range of 1:2 to 1:8 ratio by weight of genome-editing agent:fluorous agent. Ranges of genome-editing agent:fluorous agent that can be used include about a 1:2, 1:3 or 1:5 to about 1:6, 1:7, or 1:8 ratio by weight of genome-editing agent:fluorous agent. For example, in certain embodiments, the ratio of the genome-editing agent and F-bPEI is about a 1:2, 1:3, 1:4, 1:5, 1:6, 1:7, or 1:8 ratio by weight of genome-editing agent:F-bPEI, or any range of 1:2 to 1:8 ratio by weight of genome-editing agent:F-bPEI. Ranges of genome-editing agent:F-bPEI that can be used include about a 1:2, 1:3 or 1:5 to about 1:6, 1:7, or 1:8 ratio by weight of genome-editing agent:F-bPEI.

The genome-editing agent can be any of numerous biological molecules including, but not limited to, an oligopeptide, polypeptide, or protein, a nucleic acid such as an oligonucleotide or polynucleotide, and combinations thereof. In certain embodiments, the genome-editing agent is a naturally occurring biological material (e.g., a polypeptide isolated from a natural source), or is a recombinantly produced biological material (e.g., a ribonucleoprotein including a recombinantly produced Cas nuclease and a recombinantly produced guide RNA), or is a chemically modified biological material (e.g., a sequence-specific nuclease labelled with a fluorophore or other detectable label). Embodiments of the method are useful for delivering polynucleotides, polypeptides, or combinations of both polynucleotides and polypeptides to the interior or a plant cell. In embodiments, the genome-editing agent is a macromolecule, such as a protein, a complex of proteins covalently or non-covalently associated with each other, or a ribonucleoprotein. Generally, the genome-editing agent does not include an intact virus or viroid. Embodiments of the method that are particularly useful for effecting non-random genomic modification of plant cells include delivery of sequence-specific genome-editing agents, such as sequence-specific nucleases (e.g., Cas nucleases) or polynucleotides encoding such nucleases, or ribonucleoproteins including a sequence-specific nuclease, to the interior of a plant cell. See also the paragraphs captioned "Genome-Editing Agents" in the "Related Disclosure" section of this disclosure. In some embodiments, the method is useful for delivering polynucleotides encoding sequence-specific genome editing agents, such as DNA encoding base editors or DNA encoding Cas nucleases and associated guide RNAs and donor polynucleotides. In embodiments, the genome-editing agent includes a polynucleotide (e.g., DNA, RNA, or a combination of DNA and RNA), which can be isolated from a natural source, or synthetically produced; such polynucleotides can be chemically or biochemically modified, e.g., to improve stability or solubility. In embodiments, the genome-editing agent includes a polypeptide (such as a sequence-specific nuclease) having a sequence that is codon-optimized for the plant (dicot or monocot), as is best suited. In embodiments, the genome-editing agent consists essentially of one or more polynucleotides but includes no protein. In other embodiment, the genome-editing agent includes a polypeptide (e.g., a sequence-specific nuclease, a reporter protein such as a fluorescent protein) or a ribonucleoprotein (e.g., a Cas nuclease and its associated guide RNA and optional donor polynucleotide); such polypeptides can be chemically or biochemically modified, e.g., to incorporate a fluorescent label, a nuclear localization signal (NLS), or a cell-penetrating peptide (CPP). In embodiments, the genome-editing agent includes a sequence-specific genome editing agent, such as at least one genome editing agent selected from the group consisting of a sequence-specific nuclease, a ribonucleoprotein including a Cas nuclease and its associated guide RNA, a guide RNA, and a donor polynucleotide; or one or more polynucleotides encoding such. In embodiments, the genome-editing agent includes a sequence-specific genome editing agent, such as a deactivated sequence-specific nuclease (e.g., a "dead" Cas nuclease), which can be complexed with other polypeptides (e.g., polypeptides including a functional domain) or with polynucleotides or with both. In embodiments, the genome-editing agent is small in size (e.g., less than 10 nanometers in diameter for a globular protein), relative to viruses.

Thus, in certain embodiments, the genome-editing agent comprises a polynucleotide including siRNAs, miRNAs, and other "oligonucleotides" and/or a polypeptide including smaller peptides. In certain embodiments, the polynucleotide is a guide RNA (gRNA) or a polynucleotide encoding a gRNA. In certain embodiments, the genome-editing agent comprises a polypeptide or a ribonucleoprotein which can include at least one sequence-specific nuclease or a polynucleotide encoding a sequence-specific nuclease. In certain embodiments, the genome-editing agent comprises a sequence-specific nuclease, a polynucleotide encoding a sequence-specific nuclease, a guide RNA (gRNA), a polynucleotide encoding a gRNA, and/or a ribonucleoprotein including at least one sequence-specific nuclease. Thus, in certain embodiments, the method of delivering a genome-editing agent to the interior of a plant cell can result in a non-random genomic modification of the plant cell.

In certain embodiments, the plant cell to which the genome-editing agent is delivered by the method is in a plant tissue. In certain embodiments, the plant cell comprises a cell wall. In certain embodiments, the plant cell is a protoplast. In certain embodiments, the plant cell is in a liquid suspension. The plant tissue can be from many different parts of the plant including, but not limited to, being selected from the group consisting of an intact nodal bud, a shoot apex or shoot apical meristem, a root apex or root apical meristem, lateral meristem, intercalary meristem, a seedling, leaf tissue, a whole seed, a halved seed or other seed fragment, an embryo or embryonic tissue, an anther, a stigma, a style, an ovule, an ovary, callus, and a pollen grain. In certain embodiments, the plant tissue is selected from the group consisting of leaf tissue, a whole seed, a halved seed or other seed fragment, an embryo or embryonic tissue, and a pollen grain. In certain embodiments, the plant cell is located in a pollen grain, for example, in certain embodiments the plant cell is located in a pre-anthesis-stage pollen grain such as a pre-anthesis dicot pollen grain. In certain embodiments the plant cell is a cell of a haploid inducer plant and in certain embodiments the plant cell can be a cell in a pollen grain of a haploid inducer plant. In certain embodiments, the plant cell is a generative cell or a tube cell located in a pollen grain and the method comprises germinating the pollen grain. In certain embodiments, the plant cell is a generative cell or a tube cell located in a pollen grain and the method comprises germinating the pollen grain and contacting the resulting pollen tube with a stigma, stigma style, ovary, or ovum of a maternal plant, thereby resulting in fertilization of an egg of the maternal plant. And, in certain embodiments, the genome-editing agent comprises a sequence-specific genome-editing agent, the zygote produced by the fertilization comprises a non-random modification in its genome, and the non-random genomic modification is effected by the sequence-specific genome editing agent.

In certain embodiments, the plant cell, a tissue containing the plant cell, and/or the complex comprising the genome-editing agent and the fluorous agent is provided in a composition comprising an adjuvant such as, but not limited to, an adjuvant selected from the group consisting of divalent cations and polyamines. In certain embodiments, the divalent cation can be, for example, $Ca^{2+}$ or $Mg^{2+}$. In certain embodiments, the polyamine can be, for example, spermine, spermidine, or putrescine. In certain embodiments, the plant cell, a tissue containing the plant cell, and/or the complex comprising the genome-editing agent and the fluorous agent is provided in a composition comprising exogenous non-specific DNA (e.g., non-specific double-stranded DNA, non-specific single-stranded DNA, commercially available sheared salmon sperm DNA).

In certain embodiments, the plant cell and/or the plant tissue comprising the plant cell is treated before, during, and/or after contact with the complex comprising the genome-editing agent and the fluorous agent with a chemical, mechanical, and/or enzymatic treatment. Examples of such treatments include but are not limited to sonication, biolistics, treatment with micro- or nano-particles such as gold nanoparticles used for biolistics, microneedles, nanoneedles, carbon nanotubes, mesoporous silica nanoparticles, and quantum dots, and/or enzymes or chemicals such as surfactants, solvents, and chelating agents, including those that affect plant cell wall integrity (e.g., cellulase, EDTA, EGTA), abrasive treatments, heating, chilling, or combinations of any of the preceding. In certain embodiments, prior to contacting the plant cell with the complex comprising the genome-editing agent and the fluorous agent, the plant cell and/or the plant tissue comprising the plant cell, is pre-treated with such a surfactant, enzyme, abrasive, solvent, chelating agent, or a combination thereof. In certain embodiments, the plant cell and/or the plant tissue comprising the plant cell is pre-treated with an ionic liquid before contacting the plant cell with the complex comprising the genome-editing agent and the fluorous agent. It has been discovered, for example, that pre-treatment with the ionic liquid increases the efficiency of genome editing in comparison to a control without pre-treatment with the ionic liquid. In certain embodiments, the pre-treatment with the ionic liquid is for a duration of time of about 0.5 seconds to 5 minutes, about 0.5 seconds to 10 minutes, 1 second to 5 minutes, 1 second to 10 minutes, 5 seconds to 5 minutes, 5 seconds to 10 minutes, 10 seconds to 5 minutes, 10 seconds to 10 minutes, 0.5 minutes to 5 minutes, 0.5 minutes to 10 minutes. Further, the plant cell and/or the plant tissue comprising the plant cell is pre-treated in a composition comprising an amount of up to about the upper limit of saturation of the ionic liquid (about 50% by volume of the ionic liquid), e.g., about >0% to 50% by volume of the ionic liquid, of about >0% to 25% by volume of the ionic liquid, of about 5% to 50% by volume of the ionic liquid, of about 5% to 25% by volume of the ionic liquid, of about 10% to 50% by volume of the ionic liquid, of about 10% to 25% by volume of the ionic liquid,. of about 15% to 50% by volume of the ionic liquid, of about 15% to 25% by volume of the ionic liquid, or of about 15% to 20% by volume of the ionic liquid. In certain embodiments, the ionic liquid comprises tetrabutylammonium acetate (TBAA), which can be in or provided in dimethyl sulfoxide (DMSO). In certain embodiments, prior to contacting the plant cell with the complex comprising the genome-editing agent and the fluorous agent, the complex comprising the genome-editing agent and the fluorous agent is stabilized with a stabilization compound. For example, in certain embodiments, the stabilization compound can be a polysaccharide, a polyol, and/or a polyalcohol including, for example, glycols, dextrans, levans, and polyethyleneglycols, and/or sugars, such as mono-, di-, and trisaccharides (e.g., glycerol, erythritol, arabitol, sorbitol, mannitol, xylitol, mannisdomannitol, glucosylglycerol, glucose, fructose, sucrose, trehalose, isofluoroside, raffinose). In certain embodiments, the polysaccharide is a disaccharide such as, but not limited to, alpha, alpha-trehalose. The addition of a stabilization compound can be combined with lyophilisation of the complex comprising the genome-editing agent and the fluorous agent, for example to stabilize/store the complex prior to contact with the plant. Thus, certain embodiments provide for combinations of one or more of fluorous agents (e.g., fluorous surfactants, fluorous solvents, fluoroamphiphiles); genome-editing agents; ionic liquids; and stabilization compounds (e.g., trehalose) in a composition or for use in a method of this disclosure.

As noted and in furtherance of the above description, in certain embodiments, the plant cell is a cell of a dicot plant. In other embodiments, the plant cell is a cell of a monocot plant. In embodiments, the plant cell is located in a plant tissue, such as in at least one plant tissue selected from the group consisting of an intact nodal bud, a shoot apex or shoot apical meristem, a root apex or root apical meristem, lateral meristem, intercalary meristem, a seedling (e.g., a germinating seed or small seedling or a larger seedling with one or more true leaves), leaf tissue, a whole seed (e. g., an intact seed, or a seed with part or all of its seed coat removed or treated to make permeable), a halved seed or other seed fragment, an embryo (e. g., a mature dissected zygotic embryo, a developing embryo, a dry or rehydrated or freshly excised embryo) or embryonic tissue, an anther, a stigma, a style, an ovule, an ovary, and callus. In embodiments, the plant cell is in pollen (i.e., in a pollen grain). In embodiments, the plant cell is in a pre-hydrated pollen grain. In embodiments, the plant cell is located in a pre-anthesis pollen grain. In embodiments, the plant cell is located in a pre-anthesis-stage dicot pollen grain. In embodiments, the plant cell is haploid. In embodiments, the plant cell is a cell of a haploid inducer plant, such as a cell in a pollen grain of a haploid inducer plant. The method can also be used with individual plant cells (i.e., not in a tissue), such as plant cells in suspension (e.g., cultured plant cells in liquid medium) or fixed onto a solid surface or matrix. In embodiments, the plant cell, or a tissue containing the plant cell, is provided in a composition including exogenous non-specific DNA (e. g., non-specific double-stranded DNA, non-specific single-stranded DNA, commercially available sheared salmon sperm DNA). In an embodiment, the plant cell is provided in a composition including exogenous non-specific DNA at a concentration of between 0.05-1 milligrams per microliter; in an embodiment, the plant cell is provided in a composition including exogenous non-specific DNA at a concentration of between 0.1-0.5 milligrams per microliter. In an embodiment, the plant cell is in a pollen grain provided in a composition including exogenous non-specific DNA at a concentration of between 0.05-1 milligrams per microliter. In an embodiment, the plant cell is in a dicot pollen grain provided in a composition including exogenous non-specific DNA of an average size of ≤2,000 bp at a concentration of between 0.05-1 milligrams per microliter.

In certain embodiments, the plant cell includes a cell wall. In certain embodiments, the cell wall can be intact. In certain embodiments, the plant cells has not been treated by physical (e.g., sonication, abrasion, heating, or chilling), chemical (e.g., treatment with solvents or surfactants), or enzymatic treatments. In embodiments, the plant cell is in its native state, for example, a plant cell that has a cell wall that has not been treated or made porous or permeable by chemical, enzymatic, or physical means. In other embodiments, however, the plant cell or a tissue containing the plant cell, is provided in a composition further including at least one reagent, or has been pre-treated with at least one reagent, wherein the reagent can be one or more selected from the group consisting of:

(a) solvents (e. g., water, dimethylsulfoxide, dimethylformamide, acetonitrile, N-pyrrolidine, pyridine, hexamethylphosphoramide, alcohols, alkanes, alkenes, dioxanes, polyethylene glycol, and other solvents miscible or emulsifiable with water or that will dissolve phosphonucleotides in non-aqueous systems);

(b) perfluorocarbons (e.g., perfluorodecalin, perfluoromethyldecalin) and/or a fluorous agent;

(c) glycols, polysaccharides, and/or polyols (e. g., propylene glycol, polyethylene glycol);

(d) surfactants, including fluoro-surfactants (e.g., alternating polyethyleneglycol (PEG) and polytetrafluoroethylene (PTFE) co-block polymer and/or a fluorinated-branched polyethylenimine polymer (F-bPEI)), cationic surfactants, anionic surfactants, non-ionic surfactants, and amphiphilic surfactants, e. g., alkyl or aryl sulfates, phosphates, sulfonates, or carboxylates; primary, secondary, or tertiary amines; quaternary ammonium salts; sultaines, betaines; cationic lipids; phospholipids; tallowamine; bile acids such as cholic acid; saponins or glycosylated triterpenoids or glycosylated sterols (e. g., saponin commercially available as catalogue number 47036-50g-F, Sigma-Aldrich, St. Louis, Mo.); long chain alcohols; organosilicone surfactants including nonionic organosilicone surfactants such as trisiloxane ethoxylate surfactants or a silicone polyether copolymer such as a copolymer of polyalkylene oxide modified heptamethyl trisiloxane and allyloxypolypropylene glycol methylether (commercially available as SILWET L-77™ brand surfactant having CAS Number 27306-78-1 and EPA Number CAL. REG. NO. 5905-50073-AA, Momentive Performance Materials, Inc., Albany, N.Y.); specific examples of useful surfactants include sodium lauryl sulfate, the Tween series of surfactants, Triton-X100, Triton-X114, CHAPS and CHAPSO, Tergitol-type NP-40, Nonidet P-40;

(e) lipids, lipoproteins, lipopolysaccharides;

(f) acids, bases, caustic agents;

(g) peptides, proteins, or enzymes (e. g., cellulase, pectolyase, maceroenzyme, pectinase), including cell-penetrating or pore-forming peptides (e. g., (BO100)2K8, Genscript; poly-lysine, poly-arginine, or poly-homoarginine peptides; gamma zein, see US Patent Application publication 2011/0247100, incorporated herein by reference in its entirety; transcription activator of human immunodeficiency virus type 1 ("HIV-1 Tat") and other Tat proteins, see, e. g., lifetein[dot]com/Cell_Penetrating_Peptides[dot]html and Järver (2012) *Mol. Therapy—Nucleic Acids,* 1:e27,1-17); octa-arginine or nona-arginine; poly-homoarginine (see Unnamalai et al. (2004) *FEBS Letters,* 566:307-310); see also the database of cell-penetrating peptides CPPsite 2.0 publicly available at crdd[dot]osdd[dot]net/raghava/cppsite/;

(h) RNase inhibitors;

(i) cationic branched or linear polymers such as chitosan, poly-lysine, DEAE-dextran, polyvinylpyrrolidone ("PVP"), or polyethylenimine ("PEI", e. g., PEI, branched, MW 25,000, CAS #9002-98-6; PEI, linear, MW 5000, CAS #9002-98-6; PEI linear, MW 2500, CAS #9002-98-6);

(j) dendrimers (see, e. g., US Patent Application Publication 2011/0093982, incorporated herein by reference in its entirety);

(k) counter-ions, amines or polyamines (e. g., spermine, spermidine, putrescine), osmolytes, buffers, and salts (e. g., calcium phosphate, ammonium phosphate);

(l) polynucleotides (e. g., non-specific double-stranded DNA, salmon sperm DNA);

(m) transfection agents (e. g., Lipofectin®, Lipofectamine®, and Oligofectamine®, and Invivofectamine® (all from Thermo Fisher Scientific, Waltham, Mass.), PepFect (see Ezzat et al. (2011) *Nucleic Acids Res.,* 39:5284-5298), TransIt® transfection reagents (Mirus Bio, LLC, Madison, Wis.), and poly-lysine, poly-homoarginine, and poly-arginine molecules including octo-arginine and nono-arginine as described in Lu et al. (2010) *J. Agric. Food Chem.,* 58:2288-2294);

(n) antibiotics, including non-specific DNA double-strand-break-inducing agents (e. g., phleomycin, bleomycin, talisomycin);

(o) antioxidants (e. g., glutathione, dithiothreitol, ascorbate); and (p) chelating agents (e. g., EDTA, EGTA).

In some embodiments, a sequence-specific genome editing agent, such as a sequence-specific nuclease (or a polynucleotide encoding such a sequence-specific nuclease), is delivered to a plant cell located in a pollen grain, and at least one non-random genomic modification is effected by the sequence-specific genome editing agent in the plant cell. By "non-random genomic modification" is meant at least one nucleotide is inserted, deleted, or changed at a sequence-specific location within a pre-selected genomic locus. As is known in the art, the sequence-specific genome editing agent is directed to the pre-selected genomic locus by sequence-specificity, e.g., by selecting the correct guide RNA sequence to direct a Cas nuclease to the pre-selected genomic locus; the non-random genomic modification is then effected specifically at that locus. In an embodiment, a ribonucleoprotein including a Cas nuclease and guide RNA, optionally with a donor polynucleotide, is delivered to a male gamete or male reproductive cell located in a pollen grain. In embodiments, the plant cell is a generative cell or a tube cell located in a pollen grain, and the method further includes the step of germinating the pollen grain. In some embodiments, the method further includes the steps of germinating the pollen grain to form a pollen tube, and contacting the resulting pollen tube with female reproductive tissue or female gametes of a maternal plant, thereby resulting in fertilization of an egg of the maternal plant. In some embodiments, the plant cell is a generative cell located in a pollen grain, and the method further includes the steps of germinating the pollen grain to form a pollen tube and contacting the resulting pollen tube with a stigma, stigma style, ovary, or ovum of a maternal plant, thereby resulting in fertilization of an egg of the maternal plant; in certain of these embodiments, the genome-editing agent includes a sequence-specific genome-editing agent that effects a non-random genomic modification in the generative cell, and the zygote produced by the fertilization includes the non-random modification in its genome. In some embodiments, the plant cell is a tube cell located in a pollen grain, and the method further includes the steps of germinating the pollen grain and contacting the resulting pollen tube with a stigma, stigma style, ovary, or ovum of a maternal plant, thereby resulting in fertilization of an egg of the maternal plant; in certain of these embodiments, the genome-editing agent includes a sequence-specific genome editing agent, and the zygote produced by the fertilization includes a non-random modification in its genome, wherein the non-random genomic modification is effected by the sequence-specific genome editing agent. Thus, a related aspect of this disclosure provides a method of producing a plant zygote including in its genome an inherited, non-random genomic modification, wherein the non-random genomic modification is inherited from a parent germinative cell that gave rise to the zygote, and wherein the non-random genomic modification was effected in the parent germinative cell by an exogenously provided sequence-specific nuclease (or a polynucleotide encoding such a sequence-specific nuclease). In embodiments, no selection (e.g., no use of antibiotics or herbicides) is employed in the method.

Related aspects of this disclosure include the plant cell into which the exogenous biological material has been delivered (e.g., a plant cell in which a genomic modification has been effected by an exogenous sequence-specific genome editing agent that was delivered using the disclosed method), as well as progeny plant cells, tissue, plants, or seeds grown from or regenerated from the plant cell. In general, the method described should result in fertile regenerated plantlets, e.g., fertile wheat plantlets or fertile maize plantlets. In embodiments the method provides fertile plantlets including germline cells having at least one non-random genetic modification, in comparison to an unmodified control genome, wherein the at least one non-random genetic modification was effected by the exogenous biological material. In embodiments, the germline cells having at least one non-random genetic modification can give rise to further generations of seeds and plants that also contain the at least one genetic modification in their genome.

Compositions Comprising Biological Materials and Genome-Editing Agents

Provided by this disclosure are compositions comprising: a) a plant cell; and b) a complex comprising a biological material and a fluorous agent as described anywhere herein. In certain embodiments, the biological material is a genome-editing agent. In certain embodiments, the composition comprises a liquid, micelles, or an emulsion.

The fluorous agent can be any fluorous agent as described anywhere in this disclosure. In certain embodiments, the fluorous agent is a fluorous solvent. In certain embodiments, the complex further comprises a fluoro-surfactant comprising alternating polyethyleneglycol (PEG) and polytetrafluoroethylene (PTFE) co-block polymer at a mass ratio of at least about 1% in the fluorous solvent. A commercially available example of such a fluoro-surfactant is obtained from RAN Biotechnologies as product #FS008. A mass ratio of 1% in the fluorous solvent is termed the critical micelle concentration (CMC). It is contemplated that this ratio ensures that the biological cargo is encapsulated in the non-aqueous micelles. In certain embodiments, the fluorous solvent is $C_9H_5F_{15}O$ (IUPAC 2-(trifluoromethyl)-3-ethoxydodecafluorohexane). In certain embodiments, the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$. A commercially available example of such a fluoro-surfactant is obtained from RAN Biotechnologies as product #FS008. A mass ratio of 1% in the $C_9H_5F_{15}O$ is termed the critical micelle concentration (CMC). It is contemplated that this ratio ensures that the biological cargo is encapsulated in the non-aqueous micelles. In certain embodiments, the fluorous agent comprises a fluoroamphiphile such as a fluorinated-branched polyethylenimine polymer (F-bPEI). For example, in certain embodiments, a branched polyethylenimine (bPEI) has an average molecular weight of ~25,000 g/mol and is labelled with 3-Perfluorohexyl-1,2-epoxypropane as the fluorinating agent, however, it is contemplated to use branched PEIs of varying molecular weight as well as fluorinating agents of varying lengths such as described, for example, in Zhang et al. (2018) Nat. Comm., 9:1377, pp. 1-8. Representative examples of preparing the fluorous agent can be found in the Examples. In certain embodiments, the fluorous agent is dissolved in water and then complexed with the biological material. Once formed, the complex can then be diluted further into a larger reaction volume for use. In certain embodiments, the ratio of the biological material and the fluorous agent (e.g., F-bPEI) is about a 1:2, 1:3, 1:4, 1:5, 1:6, 1:7, or 1:8 ratio by weight of biological material:fluorous agent, or any range of 1:2 to 1:8 ratio by weight of biological material:fluorous agent. Ranges of biological material:fluorous agent that can be used include about a 1:2, 1:3 or 1:5 to about 1:6, 1:7, or 1:8 ratio by weight of biological material:fluorous agent. For example, in certain embodiments, the ratio of the biological material and F-bPEI is about a 1:2, 1:3, 1:4, 1:5, 1:6, 1:7, or 1:8 ratio by weight of biological material:F-bPEI, or any range of 1:2 to 1:8 ratio by weight of biological material:F-bPEI. Ranges of biological material:F-bPEI that can be used include about a 1:2, 1:3 or 1:5 to about 1:6, 1:7, or 1:8 ratio by weight of biological material:F-bPEI.

The biological material can be any biological material as described anywhere in this disclosure. In certain embodiments, the biological material can be any of numerous biological molecules including, but not limited to, a bacterial or viral transformation vector (e.g., *Agrobacterium* or other bacteria), an oligopeptide, polypeptide, or protein, a nucleic acid such as an oligonucleotide or polynucleotide, and combinations thereof. In certain embodiments, the biological material is a naturally occurring biological material (e.g., a polypeptide isolated from a natural source), or is a recombinantly produced biological material (e.g., a ribonucleoprotein including a recombinantly produced Cas nuclease and a recombinantly produced guide RNA), or is a chemically modified biological material (e.g., a sequence-specific nuclease labelled with a fluorophore or other detectable label). In embodiments, the biological material is a macromolecule, such as a protein, a complex of proteins covalently or non-covalently associated with each other, or a ribonucleoprotein. Generally, the biological material does not include an intact virus or viroid. In embodiments, the biological material includes a polynucleotide (e.g., DNA, RNA, or a combination of DNA and RNA), which can be isolated from a natural source, or synthetically produced; such polynucleotides can be chemically or biochemically modified, e.g., to improve stability or solubility. In embodiments, the biological material includes a polypeptide (such as a sequence-specific nuclease) having a sequence that is codon-optimized for the plant (dicot or monocot), as is best suited. In embodiments, the biological material consists essentially of one or more polynucleotides but includes no protein. In other embodiment, the biological material includes a polypeptide (e.g., a sequence-specific nuclease, a reporter protein such as a fluorescent protein) or a ribonucleoprotein (e.g., a Cas nuclease and its associated guide RNA and optional donor polynucleotide); such polypeptides can be chemically or biochemically modified, e.g., to incorporate a fluorescent label, a nuclear localization signal (NLS), or a cell-penetrating peptide (CPP). In embodiments, the biological material includes a sequence-specific genome editing agent, such as at least one genome editing agent selected from the group consisting of a sequence-specific nuclease, a ribonucleoprotein including a Cas nuclease and its associated guide RNA, a guide RNA, and a donor polynucleotide; or one or more polynucleotides encoding such. In embodiments, the biological material includes a sequence-specific genome editing agent, such as a deactivated sequence-specific nuclease (e.g., a "dead" Cas nuclease), which can be complexed with other polypeptides (e.g., polypeptides including a functional domain) or with polynucleotides or with both. In embodiments, the biological material is small in size (e.g., less than 10 nanometers in diameter for a globular protein), relative to viruses.

Thus, in certain embodiments, the biological material comprises: a polynucleotide including siRNAs, miRNAs, and other "oligonucleotides"; a polypeptide including smaller peptides; and a small molecule, or a combination of any thereof. In certain embodiments, the polynucleotide is a guide RNA (gRNA) or a polynucleotide encoding a gRNA. In certain embodiments, the biological material comprises a polypeptide or a ribonucleoprotein which can include at least one sequence-specific nuclease or a polynucleotide encoding a sequence-specific nuclease. For purposes of this disclosure, a small molecule" has a MWt~≤1,000 Da (having a molecular weight of less than about 1,000 Da) and is charged in certain embodiments(e.g., "Evan's blue" dye (961 Da) or sodium fluorescein dye (NaF; 376 Da) are commonly used inert tracers in blood-brain barrier (BBB) research and are both highly charged low molecular weight (LMW) tracers). In certain embodiments, the biological material comprises a sequence-specific genome-editing agent, such as a sequence-specific nuclease, a polynucleotide encoding a sequence-specific nuclease, a guide RNA (gRNA), a polynucleotide encoding a gRNA, and/or a ribonucleoprotein including at least one sequence-specific nuclease. In embodiments, the sequence-specific nuclease is one or more nuclease selected from the group consisting of a Cas nuclease, a zinc finger nuclease, a TAL effector nuclease (TALEN), and an Argonaute. In embodiments, the sequence-specific nuclease is provided as a polypeptide (or as a ribonucleoprotein, if further including a guide RNA and optionally a donor polynucleotide). In embodiments, the sequence-specific nuclease is a Cas nuclease. In embodiments, the sequence-specific nuclease is a Cas nuclease provided as a ribonucleoprotein that includes at least one guide RNA and further is provided together with at least one donor polynucleotide. In embodiments, the sequence-specific nuclease (and optionally a guide RNA and/or donor polynucleotide) is provided encoded on a polynucleotide, such as on a plasmid vector, with expression driven by a promoter suitable to the plant species (e.g., a 35S promoter, half-strength 35S promoter, SlUbi promoter, Lat52 promoter, etc.). In embodiments, the sequence-specific nuclease is deactivated ("dead") and can bind to but not cleave the targeted genomic locus; in certain embodiments such cases the sequence-specific nuclease is complexed with or fused to one or more additional functional domains. See also the paragraphs captioned "Genome-Editing Agents" in the "Related Disclosure" section of this disclosure. In embodiments, the sequence-specific nuclease is codon-optimized for the plant (dicot or monocot), as is best suited.

The plant cell of the composition can be a plant cell as described anywhere in this disclosure. In certain embodiments, the plant cell is in a plant tissue. In certain embodiments, the plant cell is of a dicot plant. In certain embodiments, the plant cell is of a monocot plant. In certain embodiments, the plant cell is in a liquid suspension. In certain embodiments, the plant cell comprises a cell wall. In certain embodiments, the plant cell is a protoplast. The plant tissue can be from many different parts of the plant including, but not limited to, being selected from the group consisting of an intact nodal bud, a shoot apex or shoot apical meristem, a root apex or root apical meristem, lateral meristem, intercalary meristem, a seedling, leaf tissue, a whole seed, a halved seed or other seed fragment, an embryo or embryonic tissue, an anther, a stigma, a style, an ovule, an ovary, callus, and a pollen grain. In certain embodiments, the plant tissue is selected from the group consisting of leaf tissue, a whole seed, a halved seed or other seed fragment, an embryo or embryonic tissue, and a pollen grain. In certain embodiments, the plant cell is located in a pollen grain, for example, in certain embodiments the plant cell is located in a pre-anthesis-stage dicot pollen grain. In certain embodiments the plant cell is a cell of a haploid inducer plant and in certain embodiments the plant cell can be a cell in a pollen grain of a haploid inducer plant. In certain embodiments, the plant cell is a generative cell or a tube cell located in a pollen grain.

In certain embodiments, the composition comprises an adjuvant such as, but not limited to, an adjuvant selected from the group consisting of divalent cations and polyamines. In certain embodiments, the divalent cation can be, for example, $Ca^{2+}$ or $Mg^{2+}$. In certain embodiments, the polyamine can be, for example, spermine, spermidine, or putrescine. In certain embodiments, the composition comprises exogenous non-specific DNA (e. g., non-specific double-stranded DNA, non-specific single-stranded DNA, commercially available sheared salmon sperm DNA).

In certain embodiments, the plant cell and/or the plant tissue comprising the plant cell is treated before, during, and/or after contact with the complex comprising the biological material and the fluorous agent with a chemical, mechanical, and/or enzymatic treatment as described anywhere in this disclosure. Examples of such treatments include but are not limited to sonication, biolistics, treatment with micro- or nano-particles such as gold nanoparticles used for biolistics, microneedles, nanoneedles, carbon nanotubes, mesoporous silica nanoparticles, and quantum dots, and/or enzymes or chemicals such as surfactants, solvents, and chelating agents, including those that affect plant cell wall integrity (e.g., cellulase, EDTA, EGTA), abrasive treatments, heating, chilling, or combinations of any of the preceding. In certain embodiments, the plant cell and/or the plant tissue comprising the plant cell has been pre-treated with a surfactant, an enzyme, an abrasive, a solvent, a chelating agent, or a combination thereof. Thus, in certain embodiments, the composition further comprises a surfactant, an enzyme, an abrasive, a solvent, a chelating agent, or a combination thereof.

In certain embodiments, the plant cell and/or the plant tissue comprising the plant cell has been pre-treated with an ionic liquid before contacting the plant cell with the complex comprising the biological material and the fluorous agent. Thus, in certain embodiments, the composition further comprises an ionic liquid as described anywhere herein. In certain embodiments, the composition comprises the ionic liquid in an amount of about >0% to 50% by volume of the ionic liquid, of about >0% to 25% by volume of the ionic liquid, of about 5% to 50% by volume of the ionic liquid, of about 5% to 25% by volume of the ionic liquid, of about 10% to 50% by volume of the ionic liquid, of about 10% to 25% by volume of the ionic liquid, of about 15% to 50% by volume of the ionic liquid, of about 15% to 25% by volume of the ionic liquid, or of about 15% to 20% by volume of the ionic liquid. In certain embodiments, the ionic liquid comprises tetrabutylammonium acetate (TBAA), which can be in or provide in dimethyl sulfoxide (DMSO).

In certain embodiments, the composition further comprises a stabilization compound that stabilizes the complex comprising the biological material and the fluorous agent. In certain embodiments, the stabilization compound is a polysaccharide, a polyol, and/or a polyalcohol including, for example, glycols, dextrans, levans, and polyethyleneglycols, and/or sugars, such as mono-, di-, and trisaccharides (e.g., glycerol, erythritol, arabitol, sorbitol, mannitol, xylitol, mannisdomannitol, glucosylglycerol, glucose, fructose, sucrose, trehalose, isofluoroside, raffinose). In certain embodiments, the polysaccharide is a disaccharide such, but not limited to apha alpha-trehalose. In certain embodiments, the complex comprising the biological material and the fluorous agent has been stabilized with the stabilization compound and lyophilized prior to incorporation into the composition. Thus, certain embodiments provide for combinations of one or more of fluorous agents (e.g., fluorous surfactants, fluorous solvents, fluoroamphiphiles); biological materials; ionic liquids; and stabilization compounds (e.g., trehalose) in a composition or for use in a method of this disclosure.

Further provided by this disclosure is a composition comprising a complex comprising a genome-editing agent and a fluorous agent as described anywhere herein. In certain embodiments, the composition comprises a liquid, micelles, or an emulsion. In certain embodiments, the composition comprises the complex comprising the genome-editing agent and the fluorous agent in a liquid.

The fluorous agent can be any fluorous agent as described anywhere in this disclosure. In certain embodiments, the fluorous agent is a fluorous solvent. In certain embodiments, the complex further comprises a fluoro-surfactant comprising alternating polyethyleneglycol (PEG) and polytetrafluoroethylene (PTFE) co-block polymer at a mass ratio of at least about 1% in the fluorous solvent. A commercially available example of such a fluoro-surfactant is obtained from RAN Biotechnologies as product #FS008. A mass ratio of 1% in the fluorous solvent is termed the critical micelle concentration (CMC). It is contemplated that this ratio ensures that the biological cargo is encapsulated in the non-aqueous micelles. In certain embodiments, the fluorous solvent is $C_9H_5F_{15}O$ (IUPAC 2-(trifluoromethyl)-3-ethoxydodecafluorohexane). In certain embodiments, the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$. A commercially available example of such a fluoro-surfactant is obtained from RAN Biotechnologies as product #FS008. A mass ratio of 1% in the $C_9H_5F_{15}O$ is termed the critical micelle concentration (CMC). It is contemplated that this ratio ensures that the biological cargo is encapsulated in the non-aqueous micelles. In certain embodiments, the fluorous agent comprises a fluoroamphiphile such as a fluorinated-branched polyethylenimine polymer (F-bPEI). For example, in certain embodiments, a branched polyethylenimine (bPEI) has an average molecular weight of ~25,000 g/mol and is labelled with 3-Perfluorohexyl-1,2-epoxypropane as the fluorinating agent, however, it is contemplated to use branched PEIs of varying molecular weight as well as fluorinating agents of varying lengths such as described, for example, in Zhang et al. (2018) Nat. Comm., 9:1377, pp. 1-8. Representative examples of preparing the fluorous agent can be found in the Examples. In certain embodiments, the fluorous agent is dissolved in water and then complexed with the genome-editing agent. Once formed, the complex can then be diluted further into a larger reaction volume for use. In certain embodiments, the ratio of the genome-editing agent and the fluorous agent (e.g., F-bPEI) is about a 1:2, 1:3, 1:4, 1:5, 1:6, 1:7, or 1:8 ratio by weight of genome-editing agent:fluorous agent, or any range of 1:2 to 1:8 ratio by weight of genome-editing agent:fluorous agent. Ranges of genome-editing agent:fluorous agent that can be used include about a 1:2, 1:3 or 1:5 to about 1:6, 1:7, or 1:8 ratio by weight of genome-editing agent:fluorous agent. For example, in certain embodiments, the ratio of the genome-editing agent and F-bPEI is about a 1:2, 1:3, 1:4, 1:5, 1:6, 1:7, or 1:8 ratio by weight of genome-editing agent:F-bPEI, or any range of 1:2 to 1:8 ratio by weight of genome-editing agent:F-bPEI. Ranges of genome-editing agent:F-bPEI that can be used include about a 1:2, 1:3 or 1:5 to about 1:6, 1:7, or 1:8 ratio by weight of genome-editing agent:F-bPEI.

The genome-editing agent can be any genome-editing agent as described anywhere in this disclosure. In certain embodiments, the genome-editing agent can be any of numerous biological molecules including, but not limited to, an oligopeptide, polypeptide, or protein, a nucleic acid such as an oligonucleotide or polynucleotide, and combinations thereof. In certain embodiments, the genome-editing agent is a naturally occurring genome-editing agent (e.g., a polypeptide isolated from a natural source), or is a recombinantly produced genome-editing agent (e.g., a ribonucleoprotein including a recombinantly produced Cas nuclease and a recombinantly produced guide RNA), or is a chemically modified genome-editing agent (e.g., a sequence-specific nuclease labelled with a fluorophore or other detectable label). In embodiments, the genome-editing agent is a macromolecule, such as a protein, a complex of proteins covalently or non-covalently associated with each other, or a ribonucleoprotein. Generally, the genome-editing agent does not include an intact virus or viroid. In embodiments, the genome-editing agent includes a polynucleotide (e.g., DNA, RNA, or a combination of DNA and RNA), which can be isolated from a natural source, or synthetically produced; such polynucleotides can be chemically or biochemically modified, e.g., to improve stability or solubility. In embodiments, the genome-editing agent includes a polypeptide (such as a sequence-specific nuclease) having a sequence that is codon-optimized for the plant (dicot or monocot), as is best suited. In embodiments, the genome-editing agent consists essentially of one or more polynucleotides but includes no protein. In other embodiment, the genome-editing agent includes a polypeptide (e.g., a sequence-specific nuclease, a reporter protein such as a fluorescent protein) or a ribonucleoprotein (e.g., a Cas nuclease and its associated guide RNA and optional donor polynucleotide); such polypeptides can be chemically or biochemically modified, e.g., to incorporate a fluorescent label, a nuclear localization signal (NLS), or a cell-penetrating peptide (CPP). In embodiments, the genome-editing agent includes a sequence-specific genome editing agent, such as at least one genome editing agent selected from the group consisting of a sequence-specific nuclease, a ribonucleoprotein including a Cas nuclease and its associated guide RNA, a guide RNA, and a donor polynucleotide; or one or more polynucleotides encoding such. In embodiments, the genome-editing agent includes a sequence-specific genome editing agent, such as a deactivated sequence-specific nuclease (e.g., a "dead" Cas nuclease), which can be complexed with other polypeptides (e.g., polypeptides including a functional domain) or with polynucleotides or with both. In embodiments, the genome-editing agent is small in size (e.g., less than 10 nanometers in diameter for a globular protein), relative to viruses. In embodiments, the composition comprising a complex comprising a fluorous agent and at least one genome-editing agent that has been complexed with micro- or nano-particles such as nanoparticles used for biolistics, microneedles, nanoneedles, carbon nanotubes, mesoporous silica nanoparticles, and quantum dots.

Thus, in certain embodiments, the genome-editing agent comprises: a polynucleotide including siRNAs, miRNAs, and other "oligonucleotides" and/or a polypeptide including smaller peptides, or a combination of any thereof. In certain embodiments, the polynucleotide is a guide RNA (gRNA) or a polynucleotide encoding a gRNA. In certain embodiments, the genome-editing agent comprises a polypeptide or a ribonucleoprotein which can include at least one sequence-specific nuclease or a polynucleotide encoding a sequence-specific nuclease. In certain embodiments, the genome-editing agent comprises a sequence-specific genome-editing agent, such as a sequence-specific nuclease, a polynucleotide encoding a sequence-specific nuclease, a guide RNA (gRNA), a polynucleotide encoding a gRNA, and/or a ribonucleoprotein including at least one sequence-specific nuclease. In embodiments, the sequence-specific nuclease is one or more nuclease selected from the group consisting of a Cas nuclease, a zinc finger nuclease, a TAL effector nuclease (TALEN), and an Argonaute. In embodiments, the sequence-specific nuclease is provided as a polypeptide (or as a ribonucleoprotein, if further including a guide RNA and optionally a donor polynucleotide). In embodiments, the sequence-specific nuclease is a Cas nuclease. In embodiments, the sequence-specific nuclease is a Cas nuclease provided as a ribonucleoprotein that includes at least one guide RNA and further is provided together with at least one donor polynucleotide. In embodiments, the sequence-specific nuclease (and optionally a guide RNA and/or donor polynucleotide) is provided encoded on a polynucleotide, such as on a plasmid vector, with expression driven by a promoter suitable to the plant species (e.g., a 35S promoter, half-strength 35S promoter, S1Ubi promoter, Lat52 promoter, etc.). In embodiments, the sequence-specific nuclease is deactivated ("dead") and can bind to but not cleave the targeted genomic locus; in certain embodiments such cases the sequence-specific nuclease is complexed with or fused to one or more additional functional domains. See also the paragraphs captioned "Genome-Editing Agents" in the "Related Disclosure" section of this disclosure. In embodiments, the sequence-specific nuclease is codon-optimized for the plant (dicot or monocot), as is best suited.

In certain embodiments, the composition comprising the complex comprises an adjuvant such as, but not limited to, an adjuvant selected from the group consisting of divalent cations and polyamines. In certain embodiments, the divalent cation can be, for example, $Ca^{2+}$ or $Mg^{2+}$. In certain embodiments, the polyamine can be, for example, spermine, spermidine, or putrescine. In certain embodiments, the composition comprises exogenous non-specific DNA (e. g., non-specific double-stranded DNA, non-specific single-stranded DNA, commercially available sheared salmon sperm DNA).

In certain embodiments, the composition comprising the complex further comprises a surfactant, an enzyme, an abrasive, a solvent, a chelating agent, or a combination thereof. In certain embodiments, the plant cell and/or the plant tissue comprising the plant cell has been pre-treated with an ionic liquid before contacting the plant cell with the complex comprising the biological material and the fluorous agent. Thus, in certain embodiments, the composition further comprises an ionic liquid as described anywhere herein. In certain embodiments, the composition comprises the ionic liquid in an amount of about >0% to 50% by volume of the ionic liquid, of about >0% to 25% by volume of the ionic liquid, of about 5% to 50% by volume of the ionic liquid, of about 5% to 25% by volume of the ionic liquid, of about 10% to 50% by volume of the ionic liquid, of about 10% to 25% by volume of the ionic liquid,. of about 15% to 50% by volume of the ionic liquid, of about 15% to 25% by volume of the ionic liquid, or of about 15% to 20% by volume of the ionic liquid. In certain embodiments, the ionic liquid comprises tetrabutylammonium acetate (TBAA), which can be in or provide in dimethyl sulfoxide (DMSO).

In certain embodiments, the composition comprising the complex further comprises a stabilization compound that stabilizes the complex comprising the biological material and the fluorous agent. In certain embodiments, the stabilization compound is a polysaccharide, a polyol, and/or a polyalcohol including, for example, glycols, dextrans, levans, and polyethyleneglycols, and/or sugars, such as mono-, di-, and trisaccharides (e.g., glycerol, erythritol, arabitol, sorbitol, mannitol, xylitol, mannisdomannitol, glucosylglycerol, glucose, fructose, sucrose, trehalose, isofluoroside, raffinose). In certain embodiments, the polysaccharide is a disaccharides such, but not limited to apha alpha-trehalose. In certain embodiments, the complex comprising the biological material and the fluorous agent has been stabilized with the stabilization compound and lyophilized prior to incorporation into the composition.

Thus, certain embodiments provide for combinations of one or more of fluorous agents (e.g., fluorous surfactants, fluorous solvents, fluoroamphiphiles); genome-editing agent; ionic liquids; and stabilization compounds (e.g., trehalose) in a composition comprising the complex.

Related Disclosure

Plants of Interest: The methods, compositions, and complexes disclosed herein are useful in effecting a non-random genetic modification in a monocot plant or in a dicot plant. In embodiments, the methods, compositions, and complexes disclosed herein are employed to effect non-random genetic modifications in cultivated plants, including those of inbred varieties or "elite" germplasm. Non-limiting examples of commercially important cultivated crops, trees, and plants include: alfalfa (*Medicago sativa*), almonds (*Prunus dulcis*), apples (*Malus* x *domestica*), apricots (*Prunus armeniaca, P. brigantine, P. mandshurica, P. mume, P. sibirica*), asparagus (*Asparagus officinalis*), bananas (*Musa* spp.), barley (*Hordeum vulgare*), beans (*Phaseolus* spp.), blueberries and cranberries (*Vaccinum* spp.), cacao (*Theobroma cacao*), canola and rapeseed or oilseed rape, (*Brassica napus*), carnation (*Dianthus caryophyllus*), carrots (*Daucus carota sativus*), cassava (*Manihot esculentum*), cherry (*Prunus avium*), chickpea (*Cider arietinum*), chicory (*Cichorium intybus*), chili peppers and other capsicum peppers (*Capsicum annuum, C. frutescens, C. chinense, C. pubescens, C. baccatum*), chrysanthemums (*Chrysanthemum* spp.), coconut (*Cocos nucifera*), coffee (*Coffea* spp. including *Coffea arabica* and *Coffea canephora*), cotton (*Gossypium hirsutum* L.), cowpea (*Vigna unguiculata*), cucumber (*Cucumis sativus*), currants and gooseberries (*Ribes* spp.), eggplant or aubergine (*Solanum melongena*), eucalyptus (*Eucalyptus* spp.), flax (*Linum usitatissumum* L.), geraniums (*Pelargonium* spp.), grapefruit (*Citrus* x *paradisi*), grapes (*Vitus* spp.) including wine grapes (*Vitus vinifera*), guava (*Psidium guajava*), hops (*Humulus lupulus*), hemp and cannabis (*Cannabis sativa* and *Cannabis* spp.), irises (*Iris* spp.), lemon (*Citrus limon*), lettuce (*Lactuca sativa*), limes (*Citrus* spp.), maize (*Zea mays* L.), mango (*Mangifera indica*), mangosteen (*Garcinia mangostana*), melon (*Cucumis melo*), millets (*Setaria* spp, *Echinochloa* spp, *Eleusine* spp, *Panicum* spp., *Pennisetum* spp.), oats (*Avena sativa*), oil palm (*Ellis quineensis*), olive (*Olea europaea*), onion (*Allium cepa*), orange (*Citrus sinensis*), papaya (*Carica papaya*), peaches and nectarines (*Prunus persica*), pear (*Pyrus* spp.), pea (*Pisa sativum*), peanut (*Arachis hypogaea*), peonies (*Paeonia* spp.), petunias (*Petunia* spp.), pineapple (*Ananas comosus*), plantains (*Musa* spp.), plum (*Prunus domestica*), poinsettia (*Euphorbia pulcherrima*), Polish canola (*Brassica rapa*), poplar (*Populus* spp.), potato (*Solanum tuberosum*), pumpkin (*Cucurbita pepo*), rice (*Oryza sativa* L.), roses (*Rosa* spp.), rubber (*Hevea brasiliensis*), rye (*Secale cereale*), safflower (*Carthamus tinctorius* L), sesame seed (*Sesame indium*), sorghum (*Sorghum bicolor*), soybean (*Glycine max* L.), squash (*Cucurbita pepo*), strawberries (*Fragaria* spp., *Fragaria* x *ananassa*), sugar beet (*Beta vulgaris*), sugarcanes (*Saccharum* spp.), sunflower (*Helianthus annus*), sweet potato (*Ipomoea batatas*), tangerine (*Citrus tangerina*), tea (*Camellia sinensis*), tobacco (*Nicotiana tabacum* L.), tomato (*Lycopersicon esculentum*), tulips (*Tulipa* spp.), turnip (*Brassica rapa rapa*), walnuts (*Juglans* spp. L.), watermelon (*Citrulus lanatus*), wheat (*Tritium aestivum*), and yams (*Discorea* spp.).

Recombinant Constructs and Vectors: Plasmids designed for use in plants and encoding CRISPR genome editing elements (CRISPR nucleases and guide RNAs) are publicly available from plasmid repositories such as Addgene (Cambridge, Mass.; also see "addgene[dot]com") or can be designed using publicly disclosed sequences, e. g., sequences of CRISPR nucleases. In embodiments, such plasmids are used to co-express both a CRISPR nuclease mRNA and guide RNA(s); in other embodiments, a CRISPR nuclease mRNA and guide RNA are encoded on separate plasmids. In embodiments, the plasmids contain left and right T-DNA borders, e.g., *Agrobacterium* TI (Ti) plasmids. Materials and methods for preparing expression cassettes and vectors for CRISPR endonuclease and guide RNA for use in genetic modification of plants are disclosed in PCT/US2015/018104 (published as WO/2015/131101 and claiming priority to U.S. Provisional Patent Application 61/945, 700), US Patent Application Publication 2015/0082478 A1, and PCT/US2015/038767 (published as WO/2016/007347 and claiming priority to U.S. Provisional Patent Application 62/023,246), all of which are incorporated herein by reference in their entirety. In embodiments, the expression cassette is adjacent to or located between T-DNA borders or contained within a binary vector, e. g., a binary vector that is compatible with Agrobacterium-mediated transformation. In other embodiments, the expression cassette does not include a T-DNA border. In embodiments, the transformation construct of the methods and systems disclosed herein includes (a) DNA encoding a CRISPR nuclease and (b) DNA encoding one or multiple guide RNAs; the transformation construct optionally includes DNA encoding one or more donor polynucleotides.

Genome Editing-Agents: Embodiments of genome editing agents include: (a) a polynucleotide selected from the group consisting of an RNA guide for an RNA-guided nuclease, a DNA encoding an RNA guide for an RNA-guided nuclease; (b) a sequence-specific nuclease selected from the group consisting of an RNA-guided nuclease, an RNA-guided DNA endonuclease, a type II Cas nuclease, a Cas9, a type V Cas nuclease, a Cpf1, a CasY, a CasX, a C2c1, a C2c3, an engineered nuclease, a codon-optimized nuclease, a zinc-finger nuclease (ZFN), a transcription activator-like effector nuclease (TAL-effector nuclease), Argonaute, a meganuclease or engineered meganuclease; or (c) a polynucleotide encoding one or more nucleases capable of effecting sequence-specific alteration of a target nucleotide sequence. Any of these nucleases can be codon-optimized, e.g., plant-codon-optimized to function optimally in a plant cell. In embodiments, one or multiple effector molecules are delivered individually (e.g., in separate compositions) or in combinations (e.g., in a ribonucleoprotein), and in a single step or multiple steps.

Zinc finger nucleases (ZFNs) are engineered proteins including a zinc finger DNA-binding domain fused to a nucleic acid cleavage domain, e.g., a nuclease. The zinc finger binding domains provide sequence specificity and can be engineered to specifically recognize any desired target DNA sequence. For a review of the construction and use of ZFNs in plants and other organisms, see, e. g., Urnov et al. (2010) *Nature Rev. Genet.,* 11:636-646. The zinc finger DNA binding domains are derived from the DNA-binding domain of a large class of eukaryotic transcription factors called zinc finger proteins (ZFPs). The DNA-binding domain of ZFPs typically contains a tandem array of at least three zinc "fingers" each recognizing a specific triplet of DNA. A number of strategies can be used to design the binding specificity of the zinc finger binding domain. One approach, termed "modular assembly", relies on the functional autonomy of individual zinc fingers with DNA. In this approach, a given sequence is targeted by identifying zinc fingers for each component triplet in the sequence and linking them into a multi-finger peptide. Several alternative strategies for designing zinc finger DNA binding domains have also been developed. These methods are designed to accommodate the ability of zinc fingers to contact neighbouring fingers as well as nucleotides bases outside their target triplet. Typically, the engineered zinc finger DNA binding domain has a novel binding specificity, compared to a naturally-occurring zinc finger protein. Engineering methods include, for example, rational design and various types of selection. Rational design includes, for example, the use of databases of triplet (or quadruplet) nucleotide sequences and individual zinc finger amino acid sequences, in which each triplet or quadruplet nucleotide sequence is associated with one or more amino acid sequences of zinc fingers which bind the particular triplet or quadruplet sequence. See, e. g., U.S. Pat. Nos. 6,453,242 and 6,534,261, both incorporated herein by reference in their entirety. Exemplary selection methods (e. g., phage display and yeast two-hybrid systems) are well known and described in the literature. In addition, enhancement of binding specificity for zinc finger binding domains has been described in U.S. Pat. No. 6,794,136, incorporated herein by reference in its entirety. In addition, individual zinc finger domains may be linked together using any suitable linker sequences. Examples of linker sequences are publicly known, e. g., see U.S. Pat. Nos. 6,479,626; 6,903,185; and 7,153,949, incorporated herein by reference in their entirety. The nucleic acid cleavage domain is non-specific and is typically a restriction endonuclease, such as FokI. This endonuclease must dimerize to cleave DNA. Thus, cleavage by FokI as part of a ZFN requires two adjacent and independent binding events, which must occur in both the correct orientation and with appropriate spacing to permit dimer formation. The requirement for two DNA binding events enables more specific targeting of long and potentially unique recognition sites. FokI variants with enhanced activities have been described; see, e. g., Guo et al. (2010) *J. Mol. Biol.*, 400:96-107.

Transcription activator like effectors (TALEs) are proteins secreted by certain *Xanthomonas* species to modulate gene expression in host plants and to facilitate the colonization by and survival of the bacterium. TALEs act as transcription factors and modulate expression of resistance genes in the plants. Recent studies of TALEs have revealed the code linking the repetitive region of TALEs with their target DNA-binding sites. TALEs comprise a highly conserved and repetitive region consisting of tandem repeats of mostly 33 or 34 amino acid segments. The repeat monomers differ from each other mainly at amino acid positions 12 and 13. A strong correlation between unique pairs of amino acids at positions 12 and 13 and the corresponding nucleotide in the TALE-binding site has been found. The simple relationship between amino acid sequence and sequence-specific DNA recognition of the TALE binding domain allows for the design of DNA binding domains of any desired specificity. TALEs can be linked to a non-specific DNA cleavage domain to prepare genome editing proteins, referred to as TAL-effector nucleases or TALENs. As in the case of ZFNs, a restriction endonuclease, such as FokI, can be conveniently used. For a description of the use of TALENs in plants, see Mahfouz et al. (2011) *Proc. Natl. Acad. Sci. USA*, 108:2623-2628 and Mahfouz (2011) *GM Crops*, 2:99-103.

Argonautes are proteins that can function as sequence-specific endonucleases by binding a polynucleotide (e. g., a single-stranded DNA or single-stranded RNA) that includes sequence complementary to a target nucleotide sequence) that guides the Argonaut to the target nucleotide sequence and effects site-specific alteration of the target nucleotide sequence; see, e. g., US Patent Application Publication 2015/0089681, incorporated herein by reference in its entirety.

In related embodiments, sequence-specific nucleases such as Cas nucleases, zinc finger nucleases, TALENs, and Argonautes are used in conjunction with other functional domains. For example, the sequence-specific nuclease activity of these nucleic acid targeting systems can be altered so that the enzyme specifically binds to but does not cleave the target DNA sequence. In embodiments, the sequence-specific nuclease is deactivated ("dead") and can bind to but not cleave the targeted genomic locus; in certain embodiments such cases the (deactivated) sequence-specific nuclease is complexed with or fused to one or more additional functional domains. Embodiments include a deactivated sequence-specific nuclease (e.g., a "dead" Cas nuclease), which can be complexed with other polypeptides (e.g., polypeptides including a functional domain) or with polynucleotides or with both. In embodiments, an active sequence-specific nuclease is non-covalently or covalently complexed with at least one polypeptide containing a functional domain. Examples of functional domains include transposase domains, integrase domains, recombinase domains, resolvase domains, invertase domains, protease domains, DNA methyltransferase domains, DNA hydroxylmethylase domains, DNA demethylase domains, histone acetylase domains, histone deacetylase domains, nuclease domains, repressor domains, activator domains, nuclear-localization signal domains, transcription-regulatory protein (or transcription complex recruiting) domains, cellular uptake activity associated domains, nucleic acid binding domains, antibody presentation domains, histone modifying enzymes, recruiter of histone modifying enzymes; inhibitor of histone modifying enzymes, histone methyltransferases, histone demethylases, histone kinases, histone phosphatases, histone ribosylases, histone deribosylases, histone ubiquitinases, histone deubiquitinases, histone biotinases and histone tail proteases. Non-limiting examples of functional domains include a transcriptional activation domain, a transcription repression domain, and an SHH1, SUVH2, or SUVH9 polypeptide capable of reducing expression of a target nucleotide sequence via epigenetic modification; see, e. g., US Patent Application Publication 2016/0017348, incorporated herein by reference in its entirety. Genomic DNA may also be modified via base editing using a fusion between a catalytically inactive "dead" Cas nuclease (dCas nuclease) is fused to a nucleobase editor, for example, a dCas9 nuclease is fused to a cytidine deaminase which converts cytosine (C) to uridine (U), thereby effecting a C to T substitution; see Komor et al. (2016) *Nature*, 533:420-424.

EXAMPLES

Example 1

This example illustrates preparation of fluorinated amphiphiles by fluoroalkylation of a cationic polymer, specifically preparation of a fluorinated branched polyethylenimine ("F-bPEI").

Fluorination of a branched polyethylenimine ("bPEI") was carried out following methods described by Zhang et al. (2018) *Nature Commun.*, 9:1377, doi:10.1038/s41467-018-03779-8 and accompanying supplemental materials. One hundred fifty milligrams of branched polyethylenimine (bPEI, average molecular weight 25000, Sigma Aldrich) was dissolved in 3 milliliters HPLC-grade methanol in a 100-milliliter round-bottomed flask. To this was added dropwise 49.1 microliters (36 molar equivalents) of perfluorohexylpropyl epoxide, and the flask walls rinsed with an additional 3 milliliters methanol. The flask was sealed with a rubber septum and the reaction was stirred on a magnetic stirrer 24 hours at room temperature. The completed reaction mixture was clear and colourless. The reaction mixture was concentrated by centrifugation (4000×G) through a 3000 MWCO filter (Amicon) and lyophilized. The reaction was estimated to have gone to about 2/3 completion based on the weight of the lyophilized product. The lyophilized product was a thick syrup which could be dissolved at about 1 microgram/microliter in water with heating to about 60 degrees Celsius and vortexing.

Fluorinated branched polyethylenimines of different molecular weights are prepared using similar procedures.

Example 2

This example illustrates use of a fluorinated branched polyethylenimine ("F-bPEI") to deliver a protein into nuclei of intact maize cells.

Green fluorescent protein fused to a nuclear localization signal (GFP-NLS) was complexed at 0, 1, 2, or 10 micrograms protein with 2 micrograms F-bPEI (see Example 1) for 2 hours in a total volume of 50 microliters (total volume made up with water). After complexing, each preparation was brought to 250 microliter volume with water, to which another 250 microliters of either water or BMS medium was added for a total volume of 500 microliters. Maize (Zea mays, Black Mexican Sweet, "BMS") suspension cells were isolated using a vacuum filter and a small quantity of cells was placed in low-DNA-binding tubes together with the protein preparation. The tubes were incubated on a shaker at room temperature for 4 hours followed by 3 washes with BMS media. Cells were then mounted and visualized under a fluorescent microscope. In these experiment, strong green fluorescence was observed to be nuclear, indicating F-bPEI successfully delivered the protein through the cell wall of intact plant cells and into the nucleus.

In analogous procedures, F-bPEI is complexed with a Cas nuclease ribonucleoprotein (RNP) formed by a Cas nuclease and a guide RNA targeting the maize Lc gene and added to BMS cells which are then incubated 48 hours at room temperature in the dark, resulting in delivery of the RNP into the maize cells and editing of the endogeous target LC gene.

Example 3

This experiment illustrates the use of a fluoroamphiphile, a fluorinated branched polyethylenimine ("F-bPEI"), to deliver a Cas nuclease into maize embryos.

A Cas nuclease ribonucleoprotein (RNP) complex designed to target the Zea mays Lc gene was made by mixing a Cas nuclease with the corresponding guide RNA at a ratio of 1:2 and incubating 20 minutes at room temperature. The RNP was complexed with 2 micrograms F-bPEI (see Example 1) at a F-bPEI:RNP weight/weight ratio of about 1:8 or 1:4 or 1:2; the RNP/F-bPEI mixture was incubated 2 hours at room temperature.

12 DAP maize (Zea mays, B104) embryos were added to low-DNA-binding tubes containing the RNP/F-bPEI preparation and incubated in the dark at 26 degrees Celsius for 4 hours. Additional experiments were carried out for up to 48 hours. Genomic DNA was extracted and subjected to amplicon sequencing to detect edits of the target gene. Low levels (<1%) of editing of the Lc gene were observed, indicating direct editing of the maize embryos.

In further experiments, maize plants are grown from directly edited maize embryos prepared as above and those plants having the desired edits of the Lc gene are identified Similar experiments are carried out with soybean (Glycine max) embryos using F-bPEI to deliver a Cas nuclease RNP complex targeting the Glycine max SHAT1.5 gene, resulting in editing of the endogenous SHAT1.5 gene directly in the soybean embryos; optionally, edited soybean plants are grown from the edited embryos.

Example 4

This experiment illustrates the use of a fluoroamphiphile, a fluorinated branched polyethylenimine ("F-bPEI"), to deliver a Cas nuclease into maize protoplasts.

A Cas nuclease ribonucleoprotein (RNP) complex designed to target the Zea mays Lc gene was made by mixing a Cas nuclease with the corresponding guide RNA at a nuclease:guide molar ratio of either 1:8.5 or 1:2 and incubating 20 minutes at room temperature. The RNP was complexed with 2.5 micrograms F-bPEI at a F-bPEI:nuclease weight/weight ratio of about 1:4; the RNP/F-bPEI mixture was incubated 2 hours at room temperature.

About 40,000 maize (Zea mays, B104) protoplasts in 200 microliters were added to each treatment, the volume was brought up to 500 microliters with maize wash buffer, and the protoplasts incubated in the dark at room temperature for 48 hours. For comparison, parallel transformations using polyethylene glycol (see procedure described in U.S. Patent Application Publication 2019/0352655) were carried out with equivalent amounts of RNP and protoplasts. Genomic DNA was extracted from each protoplast sample and subjected to amplicon sequencing to detect edits of the target gene. With the F-bPEI protocol, editing of the target gene of about 7.4% was obtained using the higher nuclease:guide ratio of 1:2, and about 1.4% using a 1:8.5 ratio. Editing efficiency in this preliminary experiment was lower than that obtained using the PEG-mediated transformation protocol where the lower nuclease:guide ratio gives a higher editing efficacy of about 75-80%. Nonetheless, these results indicate that F-bPEI effectively delivers Cas nuclease RNPs and mediates editing of a specific target gene in the maize cells.

Example 5

This example illustrates use of a fluorous surfactant/fluorous solvent to deliver a lyophilized protein into plant cells (wheat mature embryos) that have been pre-treated with an ionic liquid.

Sets of ten wheat (Triticum aestivum, cultivar AC Andrew) mature embryos in Eppendorf tubes were treated for 1 minute with 250 microliters 20% tetrabutylammonium acetate (TBAA) in dimethyl sulfoxide (DMSO), followed by 4 washes of MilliQ $H_2O$. A fluorous surfactant in fluorous solvent non-aqueous mixture of 1% 008-FluoroSurfactant in HFE-7500 was prepared by resuspending 100 microliters of 10% 008-FluoroSurfactant stock solution (RAN Biotechnologies, Inc., Beverly, Mass.) in 900 microliters of HFE-7500 solvent (RAN Biotechnologies, Inc., Beverly, Mass.). Fifty microliters of the 1% 008-FS in HFE-7500 was added to lyophilized protein (0, 1, 5, 20 micrograms), mixed by flicking the tubes, and then sonicated in a water bath for 5 seconds to create micelles. A set of ten embryos was placed into each tube and incubated overnight in the dark. The embryos were plated on ½ MS solid media, placed back in the dark, and imaged under a fluorescent microscope 24 hours post treatment. Strong red fluorescence was observed at least on the outside of the embryos; internal red fluorescence was not definitively observed under these conditions.

Example 6

This example illustrates fluorous surfactant/fluorous solvent delivery of a lyophilized protein into nuclei of intact maize cells.

Green fluorescent protein fused with a nuclear localization signal (GFP-NLS) was lyophilized, resuspended at 0, 1, 5, or 20 micrograms protein in Eppendorf tubes containing 500 microliters of 1% 008-FS in HFE-7500 (see Example 5), and sonicated for 3-5 seconds. Maize (Zea mays, Black Mexican Sweet, "BMS") suspension cells were isolated using a vacuum filter and a small quantity of cells was placed in each Eppendorf tubes. The tubes were incubated for 5 mins or 1 hour on a shaker at room temperature, after which the cells were washed 3 times with BMS medium. The cells were resuspended in 500 microliters BMS medium per tube, to which 500 microliters of 1 microgram/milliliter DAPI as a nuclear counter-stain was added. The cells were placed on a shaker for 15 minutes followed by 3 washes with BMS media. Cells were then mounted and visualized under a fluorescent microscope. This procedure resulted in GFP signal being observed in the cells' nuclei, co-localized with the DAPI signal, indicating transport or delivery of the GFP protein through or across the plant cell wall and into the nucleus.

In analogous procedures, a lyophilized Cas nuclease ribonucleoprotein (RNP) formed by a Cas nuclease and a guide RNA targeting the maize Lc gene is resuspended in 1% 008-FS in HFE-750 (see Example 5), sonicated for a few seconds, and added to BMS cells. The cells are incubated 48 hours at room temperature in the dark, resulting in delivery of the RNP into the maize cells and editing of the endogenous target LC gene.

Example 7

This example illustrates fluorous solvent delivery of a lyophilized Cas nuclease RNP stabilized with trehalose to maize embryos pre-treated with an ionic liquid.

A Cas nuclease ribonucleoprotein (RNP) complex designed to target the Zea mays Lc gene was made by mixing a Cas nuclease with the corresponding guide RNA at a ratio of 1:2. The RNP mixture was lyophilized with trehalose as a stabilizer added to the RNP mixture at a ratio of 1 microgram trehalose to about 28 pmol RNP. 12-DAP maize (Zea mays, B104) embryos were pre-treated with an ionic liquid (tetrabutylammonium acetate, "TBAA", e.g., as a 15-20% TBAA w/w solution in DMSO) as follows. Ten embryos at a time are placed on a 70-micrometer cell strainer over a waste vessel. Two hundred fifty microliters of 15% TBAA in dimethylsulfoxide (DMSO) (w/w) was dropped onto the embryos, followed immediately by 3-5 rinses with sterile water. The embryos were air-dried or dried by contacting with a piece of sterile filter paper. Control embryos were treated similarly but without TBAA. The lyophilized RNP-trehalose mixture was resuspended by mixing and sonicating (2-3 seconds) in 400-500 microliters of fluorous solvent, HFE-7500 solvent (RAN Biotechnologies, Inc., Beverly, Mass.). Five to ten embryos were added to the RNP composition at 40, 60, or 120 pmol RNP per tube and incubated 24 hours at 26 degrees Celsius in the dark. The treated embryos were then plated on ½ MS medium and placed back in the dark at 26 degrees Celsius. Embryos were sampled 24-120 hours after treatment and then analysed by amplicon sequencing to detect editing of the target Lc gene. The target Lc gene was edited at about 1% of all amplicon reads in the embryos that were not treated with TBAA, indicating that the HFE-7500 solvent on its own delivered the RNP into the embryos. The Lc gene was edited at 4% in embryos that were pre-treated with TBAA, indicating that pre-treatment with ionic liquid improves delivery of the RNP and the resulting editing efficiency in maize embryos.

Further experiments repeat the above procedures for direct editing of the endogenous Lc gene in maize B104 embryos, from which are grown maize plants containing the desired edit in the LC gene.

Example 8

This experiment illustrates the use of fluorous agents in improving efficiency of bacterially mediated transformation of plants and plant cells.

Two strains of Agrobacterium (LBA4404 and GV3101) each transformed with a T-DNA including a green fluorescent protein (GFP) expression construct driven by a dicot ubiquitin promoter were separately spun down after 4 hours in infiltration buffer. Fifteen microliters were collected from each pellet and transferred to 1.5-milliliter Lo-Bind Eppendorf tubes, to which was added 1 milliliter of 1% FS-008 surfactant in HFE-7500 (a 1:10 mixture of 10% FS-008 surfactant in HFE-7500 and neat HFE-7500). The tubes were vortexed vigorously and sonicated until the bacteria were well dispersed in the suspension. In parallel, control suspensions of Agrobacterium were prepared in standard aqueous infiltration buffer. Leaf infiltrations of Nicotiana benthamiana were performed. Using aqueous buffer, infiltration of N. benthamiana with either Agrobacterium vector resulted in GFP expression only immediately around the infiltration site. Using the non-aqueous fluorous surfactant/fluorous solvent, infiltration of N. benthamiana with either Agrobacterium vector resulted in strong GFP expression throughout the leaf, with expression stronger using the GV3101 strain compared to the LBA4404 strain.

In analogous procedures, Agrobacterium transformed with a T-DNA including a Cas nuclease expression construct and an expression construct for at least one guide RNA targeting an endogenous soybean gene is used to directly transform soybean embryos using procedures similar to the above, wherein the Agrobacterium vector is suspended in 1% FS-008 surfactant in HFE-7500 prior to application to the soybean embryos. Soybean plants are regenerated from the transformed embryos and those plants containing the edited gene are identified.

All cited patents and patent publications referred to in this application are incorporated herein by reference in their entirety. All of the materials and methods disclosed and claimed herein can be made and used without undue experimentation as instructed by the above disclosure and illustrated by the examples. Although the materials and methods of this disclosure have been described in terms of embodiments and illustrative examples, it will be apparent to those of skill in the art that substitutions and variations can be applied to the materials and methods described herein without departing from the concept, spirit, and scope of the disclosure. For instance, while the particular examples provided illustrate the methods and embodiments described herein using a specific plant, the principles in these examples are applicable to any plant of interest. All such similar substitutes and modifications apparent to those skilled in the art are deemed to be within the spirit, scope, and concept of the disclosure as encompassed by the embodiments recited herein and the specification and appended claims.

EMBODIMENTS

1. A method of delivering a biological material to the interior of a plant cell, the method comprising contacting the plant cell with a complex comprising the biological material and a fluorous agent, wherein the fluorous agent does not consist of a perfluorocarbon, wherein the biological material is delivered to the interior of the plant cell, and wherein the complex comprising the biological material and the fluorous agent is provided in a liquid, in micelles, or in an emulsion.
2. The method of embodiment 1, wherein the fluorous agent is $C_9H_5F_{15}O$ (IUPAC 2-(trifluoromethyl)-3-ethoxydodecafluorohexane); optionally, wherein the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$.
3. The method of embodiment 1, wherein the fluorous agent is a fluorinated-branched polyethylenimine polymer (F-bPEI); optionally, wherein the F-bPEI is dissolved in water and complexed to the biological material; and/or optionally, wherein the ratio of biological material to F-bPEI is about a 1:2 to 1:8 ratio by weight of biological material:F-bPEI.
4. The method of any one of embodiments 1 to 3, wherein the biological material comprises a polynucleotide, a polypeptide, a small molecule, or a combination of any thereof.
5. The method of any one of embodiments 1 to 3, wherein the biological material comprises a polynucleotide, optionally, wherein the polynucleotide is a guide RNA (gRNA) or a polynucleotide encoding a gRNA.
6. The method of any one of embodiments 1 to 3, wherein the biological material comprises a polypeptide or a ribonucleoprotein.
7. The method of embodiment 6, wherein the biological material comprises a ribonucleoprotein including at least one sequence-specific nuclease or a polynucleotide encoding a sequence-specific nuclease.
8. The method of any one of embodiments 1 to 3, wherein the biological material is a small molecule having a molecular weight of less than about 1,000 Da.
9. The method of any one of embodiments 1 to 8, wherein the plant cell is in a plant tissue.
10. The method of any one of embodiments 1 to 9, wherein the plant cell and/or the plant tissue comprising the plant cell is treated before, during, and/or after contact with the complex comprising the biological material and the fluorous agent with a chemical, mechanical, and/or enzymatic treatment, optionally, wherein before contacting the plant cell with the complex comprising the biological material and the fluorous agent, the plant cell and/or the plant tissue comprising the plant cell is pre-treated with an ionic liquid, and/or optionally, wherein the biological material is a genome-editing agent and pre-treatment with the ionic liquid increases the efficiency of genome editing in comparison to a control without pre-treatment with the ionic liquid.
11. The method of embodiment 10, wherein the plant cell is pre-treated with the ionic liquid for a duration of time of about 0.5 seconds to 5 minutes, about 0.5 seconds to 10 minutes, 1 second to 5 minutes, 1 second to 10 minutes, 5 seconds to 5 minutes, 5 seconds to 10 minutes, 10 seconds to 5 minutes, 10 seconds to 10 minutes, 0.5 minutes to 5 minutes, or 0.5 minutes to 10 minutes; and/or wherein the plant cell and/or the plant tissue comprising the plant cell is pre-treated in a composition comprising an amount of about >0% to 50% by volume of the ionic liquid, of about >0% to 25% by volume of the ionic liquid, of about 5% to 50% by volume of the ionic liquid, of about 5% to 25% by volume of the ionic liquid, of about 10% to 50% by volume of the ionic liquid, of about 10% to 25% by volume of the ionic liquid,. of about 15% to 50% by volume of the ionic liquid, of about 15% to 25% by volume of the ionic liquid, or of about 15% to 20% by volume of the ionic liquid.
12. The method of embodiment 10 or 11, wherein the ionic liquid comprises tetrabutylammonium acetate (TBAA); optionally, wherein the TBAA is in or provided in dimethyl sulfoxide (DMSO).
13. The method of any one of embodiments 1 to 12, wherein prior to contacting the plant cell with the complex comprising the biological material and the fluorous agent, the plant cell and/or the plant tissue comprising the plant cell, is pre-treated with a surfactant, an enzyme, an abrasive, a solvent, a chelating agent, or a combination thereof.
14. The method of any one of embodiments 1 to 13, wherein prior to contacting the plant cell with the complex comprising the biological material and the fluorous agent, the complex comprising the biological material and the fluorous agent is stabilized with a stabilization compound.
15. The method of embodiment 14, wherein the stabilization compound is a polysaccharide, a polyol, and/or a polyalcohol; optionally, wherein the polysaccharide is a disaccharide.
16. The method of embodiment 15, wherein the disaccharide is alpha, alpha-trehalose.
17. The method of any one of embodiments 14 to 16, wherein the complex comprising the biological material and the fluorous agent that is stabilized with the stabilization compound has been lyophilized prior to contact with the plant cell.
18. The method of any one of embodiments 1 to 17, wherein the biological material comprises a sequence-specific genome-editing agent.
19. The method of embodiment 18, wherein the genome-editing agent is selected from the group consisting of a sequence-specific nuclease, a polynucleotide encoding a sequence-specific nuclease, a guide RNA (gRNA), a polynucleotide encoding a gRNA, and a ribonucleoprotein including at least one sequence-specific nuclease.
20. The method of embodiment 18 or 19, resulting in a non-random genomic modification of the plant cell.
21. The method of any one of embodiments 1 to 20, wherein the plant cell is of a dicot plant.
22. The method of any one of embodiments 1 to 20, wherein the plant cell is of a monocot plant.
23. The method of any one of embodiments 1 to 20, wherein the plant cell comprises a cell wall or wherein the plant cell is a protoplast.
24. The method of embodiment 23, wherein the plant cell is in a liquid suspension.
25. The method of any one of embodiments 9 to 24, wherein the plant tissue is selected from the group consisting of an intact nodal bud, a shoot apex or shoot apical meristem, a root apex or root apical meristem, lateral meristem, intercalary meristem, a seedling, leaf tissue, a whole seed, a halved seed or other seed fragment, an embryo or embryonic tissue, an anther, a stigma, a style, an ovule, an ovary, callus, and a pollen grain.

26. The method of embodiment 25, wherein the plant tissue is selected from the group consisting of leaf tissue, a whole seed, a halved seed or other seed fragment, an embryo or embryonic tissue, and a pollen grain.

27. The method of any one of embodiments 1 to 26, wherein the plant cell is a cell of a haploid inducer plant, optionally, wherein the plant cell is a cell in a pollen grain of a haploid inducer plant.

28. The method of any one of embodiments 1 to 27, wherein the plant cell, a tissue containing the plant cell, and/or the complex comprising the biological material and the fluorous agent is provided in a composition comprising an adjuvant selected from the group consisting of divalent cations and polyamines; optionally, wherein the divalent cation is $Ca^{2+}$ and/or $Mg^{2+}$; and/or optionally, wherein the polyamine is spermine, spermidine, or putrescine.

29. The method of any one of embodiments 1 to 28, wherein the plant cell is a generative cell or a tube cell located in a pollen grain, and wherein the method further comprises germinating the pollen grain.

30. The method of embodiment 29, wherein the plant cell is a generative cell or a tube cell located in a pollen grain, and wherein the method further comprises germinating the pollen grain and contacting the resulting pollen tube with a stigma, stigma style, ovary, or ovum of a maternal plant, thereby resulting in fertilization of an egg of the maternal plant.

31. The method of embodiment 30, wherein the biological material comprises a sequence-specific genome editing agent, and wherein the zygote produced by the fertilization comprises a non-random modification in its genome, wherein the non-random genomic modification is effected by the sequence-specific genome editing agent.

32. A method of delivering a genome-editing agent to the interior of a plant cell, the method comprising contacting the plant cell with a complex comprising the genome-editing agent and a fluorous agent, wherein the fluorous agent does not consist of a perfluorocarbon, wherein the genome-editing agent is delivered to the interior of the plant cell, wherein the plant cell is contacted with the complex comprising the genome-editing agent and the fluorous agent in a liquid, in micelles, or in an emulsion.

33. The method of embodiment 32, wherein the fluorous agent is $C_9H_5F_{15}O$ (IUPAC 2-(trifluoromethyl)-3-ethoxydodecafluorohexane); optionally, wherein the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$.

34. The method of embodiment 32, wherein the fluorous agent is a fluorinated-branched polyethylenimine polymer (F-bPEI); optionally, wherein the F-bPEI is dissolved in water and complexed to the genome-editing agent; and/or optionally, wherein the ratio of genome-editing agent to F-bPEI is about a 1:2 to 1:8 ratio by weight of genome-editing agent:F-bPEI.

35. The method of any one of embodiments 32 to 34, wherein the genome-editing agent comprises a polynucleotide, optionally, wherein the polynucleotide is a guide RNA (gRNA) or a polynucleotide encoding a gRNA.

36. The method of any one of embodiments 32 to 34, wherein the genome-editing agent comprises a polypeptide or a ribonucleoprotein.

37. The method any one of embodiments 32 to 34, wherein the genome-editing agent is selected from the group consisting of a sequence-specific nuclease, a polynucleotide encoding a sequence-specific nuclease, a guide RNA (gRNA), a polynucleotide encoding a gRNA, and a ribonucleoprotein including at least one sequence-specific nuclease.

38. The method of any one of embodiments 32 to 37, wherein the plant cell is in a plant tissue.

39. The method of any one of embodiments 32 to 38, wherein prior to contacting the plant cell with the complex comprising the genome-editing agent and the fluorous agent, the plant cell and/or the plant tissue comprising the plant cell is pre-treated with an ionic liquid, optionally, wherein pre-treatment with the ionic liquid increases the efficiency of genome editing in comparison to a control without pre-treatment with the ionic liquid.

40. The method of embodiment 39, wherein the plant cell is pre-treated with the ionic liquid for a duration of time of about 0.5 seconds to 5 minutes, about 0.5 seconds to 10 minutes, 1 second to 5 minutes, 1 second to 10 minutes, 5 seconds to 5 minutes, 5 seconds to 10 minutes, 10 seconds to 5 minutes, 10 seconds to 10 minutes, 0.5 minutes to 5 minutes, or 0.5 minutes to 10 minutes; and/or wherein the plant cell and/or the plant tissue comprising the plant cell is pre-treated in a composition comprising an amount of about >0% to 50% by volume of the ionic liquid, of about >0% to 25% by volume of the ionic liquid, of about 5% to 50% by volume of the ionic liquid, of about 5% to 25% by volume of the ionic liquid, of about 10% to 50% by volume of the ionic liquid, of about 10% to 25% by volume of the ionic liquid,. of about 15% to 50% by volume of the ionic liquid, of about 15% to 25% by volume of the ionic liquid, or of about 15% to 20% by volume of the ionic liquid.

41. The method of embodiment 39 or 40, wherein the ionic liquid comprises tetrabutylammonium acetate (TBAA); optionally, wherein the TBAA is in or provided in dimethyl sulfoxide (DMSO).

42. The method of any one of embodiments 32 to 41, wherein prior to contacting the plant cell with the complex comprising the genome-editing agent and the fluorous agent, the plant cell and/or the plant tissue comprising the plant cell, is pre-treated with a surfactant, an enzyme, an abrasive, a solvent, a chelating agent, or a combination thereof 43. The method of any one of embodiments 32 to 42, wherein prior to contacting the plant cell with the complex comprising the genome-editing agent and the fluorous agent, the complex comprising the genome-editing agent and the fluorous agent is stabilized with a stabilization compound.

44. The method of embodiment 43, wherein the stabilization compound is a polysaccharide, a polyol, and/or a polyalcohol; optionally, wherein the polysaccharide is a disaccharide.

45. The method of embodiment 44, wherein the disaccharide is alpha, alpha-trehalose.

46. The method of any one of embodiments 43 to 45, wherein the complex comprising the genome-editing agent and the fluorous agent that is stabilized with the stabilization compound has been lyophilized prior to contact with the plant cell.

47. The method of any one of embodiments 32 to 46, resulting in a non-random genomic modification of the plant cell.

48. The method of any one of embodiments 32 to 47, wherein the plant cell is of a dicot plant.

49. The method of any one of embodiments 32 to 47, wherein the plant cell is of a monocot plant.

50. The method of any one of embodiments 32 to 49, wherein the plant cell comprises a cell wall or wherein the plant cell is a protoplast.

51. The method of embodiment 50, wherein the plant cell is in a liquid suspension.

52. The method of any one of embodiments 38 to 51, wherein the plant tissue is selected from the group consisting of an intact nodal bud, a shoot apex or shoot apical meristem, a root apex or root apical meristem, lateral meristem, intercalary meristem, a seedling, leaf tissue, a whole seed, a halved seed or other seed fragment, an embryo or embryonic tissue, an anther, a stigma, a style, an ovule, an ovary, callus, and a pollen grain.

53. The method of embodiment 52, wherein the plant tissue is selected from the group consisting of leaf tissue, a whole seed, a halved seed or other seed fragment, an embryo or embryonic tissue, and a pollen grain.

54. The method of any one of embodiments 32 to 53, wherein the plant cell is a cell of a haploid inducer plant, optionally, wherein the plant cell is a cell in a pollen grain of a haploid inducer plant.

55. The method of any one of embodiments 32 to 54, wherein the plant cell, a tissue containing the plant cell, or the complex comprising the genome-editing agent and the fluorous agent is provided in a composition comprising an adjuvant selected from the group consisting of divalent cations and polyamines; optionally, wherein the divalent cation is $Ca^{2+}$ and/or $Mg^{2+}$; and/or optionally, wherein the polyamine is spermine, spermidine, or putrescine.

56. The method of any one of embodiments 32 to 55, wherein the plant cell is a generative cell or a tube cell located in a pollen grain, and wherein the method further comprises germinating the pollen grain.

57. The method of embodiment 56, wherein the plant cell is a generative cell or a tube cell located in a pollen grain, and wherein the method further comprises germinating the pollen grain and contacting the resulting pollen tube with a stigma, stigma style, ovary, or ovum of a maternal plant, thereby resulting in fertilization of an egg of the maternal plant.

58. The method of embodiment 57, wherein the biological material comprises a sequence-specific genome editing agent, and wherein the zygote produced by the fertilization comprises a non-random modification in its genome, wherein the non-random genomic modification is effected by the sequence-specific genome editing agent.

59. A composition comprising: a) a plant cell; and b) a complex comprising a biological material and a fluorous agent, wherein the fluorous agent does not consist of a perfluorocarbon, optionally, wherein the biological material is a genome-editing agent, and/or optionally, wherein the composition comprises a liquid, micelles, or an emulsion.

60. The composition of embodiment 59, wherein the fluorous agent is $C_9H_5F_{15}O$ (IUPAC 2-(trifluoromethyl)-3-ethoxydodecafluorohexane); optionally, wherein the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$.

61. The composition of embodiment 60, wherein the fluorous agent is a fluorinated-branched polyethylenimine polymer (F-bPEI); optionally, wherein the F-bPEI is dissolved in water and complexed to the biological material; and/or optionally, wherein the ratio of biological material is about a 1:2 to 1:8 ratio by weight of biological material:F-bPEI.

62. The composition of any one of embodiments 59 to 61, wherein the biological material comprises a polynucleotide, a polypeptide, a small molecule, or a combination of any thereof.

63. The composition of any one of embodiments 59 to 61, wherein the biological material comprises a polynucleotide, optionally, wherein the polynucleotide is a guide RNA (gRNA) or a polynucleotide encoding a gRNA.

64. The composition of any one of embodiments 59 to 61, wherein the biological material comprises a polypeptide or a ribonucleoprotein.

65. The composition of embodiment 64, wherein the biological material comprises a ribonucleoprotein including at least one sequence-specific nuclease or a polynucleotide encoding a sequence-specific nuclease.

66. The composition of any one of embodiments 59 to 61, wherein the biological material is a small molecule having a molecular weight of less than about 1,000 Da.

67. The composition of any one of embodiments 59 to 66, wherein the plant cell is in a plant tissue.

68. The composition of any one of embodiments 59 to 67, wherein the composition further comprises an ionic liquid.

69. The composition of embodiment 68, wherein the composition comprises the ionic liquid in an amount of about >0% to 50% by volume of the ionic liquid, of about >0% to 25% by volume of the ionic liquid, of about 5% to 50% by volume of the ionic liquid, of about 5% to 25% by volume of the ionic liquid, of about 10% to 50% by volume of the ionic liquid, of about 10% to 25% by volume of the ionic liquid, of about 15% to 50% by volume of the ionic liquid, of about 15% to 25% by volume of the ionic liquid, or of about 15% to 20% by volume of the ionic liquid.

70. The composition of embodiment 68 or 69, wherein the ionic liquid comprises tetrabutylammonium acetate (TBAA); optionally, wherein the TBAA is in or provide in dimethyl sulfoxide (DMSO).

71. The composition of any one of embodiments 59 to 70, wherein the composition further comprises a surfactant, an enzyme, an abrasive, a solvent, a chelating agent, or a combination thereof.

72. The composition of any one of embodiments 59 to 71, wherein the composition further comprises a stabilization compound that stabilizes the complex comprising the biological material and the fluorous agent.

73. The composition of embodiment 72, wherein the stabilization compound is a polysaccharide, a polyol, and/or a polyalcohol; optionally, wherein the polysaccharide is a disaccharide.

74. The composition of embodiment 73, wherein the disaccharide is alpha alpha-trehalose.

75. The composition of any one of embodiments 72 to 74, wherein the complex comprising the biological material and the fluorous agent has been stabilized with the stabilization compound and lyophilized prior to incorporation into the composition.

76. The composition of any one of embodiments 59 to 75, wherein the biological material comprises a sequence-specific genome-editing agent.

77. The composition of embodiment 76, wherein the genome-editing agent is selected from the group consisting of a sequence-specific nuclease, a polynucleotide encoding a sequence-specific nuclease, a guide RNA (gRNA), a polynucleotide encoding a gRNA, and a ribonucleoprotein including at least one sequence-specific nuclease.
78. The composition of any one of embodiments 59 to 77, wherein the plant cell is of a dicot plant.
79. The composition of any one of embodiments 59 to 77, wherein the plant cell is of a monocot plant.
80. The composition of any one of embodiments 59 to 79, wherein the plant cell comprises a cell wall or wherein the plant cell is a protoplast.
81. The composition of embodiment 80, wherein the plant cell is in a liquid suspension.
82. The composition of any one of embodiments 67 to 81, wherein the plant tissue is selected from the group consisting of an intact nodal bud, a shoot apex or shoot apical meristem, a root apex or root apical meristem, lateral meristem, intercalary meristem, a seedling, leaf tissue, a whole seed, a halved seed or other seed fragment, an embryo or embryonic tissue, an anther, a stigma, a style, an ovule, an ovary, callus, and a pollen grain.
83. The composition of embodiment 82, wherein the plant tissue is selected from the group consisting of leaf tissue, a whole seed, a halved seed or other seed fragment, an embryo or embryonic tissue, and a pollen grain.
84. The composition of any one of embodiments 59 to 83, wherein the plant cell is a cell of a haploid inducer plant, optionally, wherein the plant cell is a cell in a pollen grain of a haploid inducer plant.
85. The composition of any one of embodiments 59 to 84, wherein the composition further comprises and adjuvant selected from the group consisting of divalent cations and polyamines; optionally, wherein the divalent cation is $Ca^{2+}$ and/or $Mg^{2+}$; and/or optionally, wherein the polyamine is spermine, spermidine, or putrescine.
86. The composition of any one of embodiments 59 to 85, wherein the plant cell is a generative cell or a tube cell located in a pollen grain.
87. A composition comprising a complex comprising a genome-editing agent and a fluorous agent, wherein the fluorous agent does not consist of a perfluorocarbon, optionally, wherein the composition comprises a liquid, micelles, or an emulsion.
88. The composition of embodiment 87, wherein the fluorous agent is $C_9H_5F_{15}O$ (IUPAC 2-(trifluoromethyl)-3-ethoxydodecafluorohexane); optionally, wherein the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$.
89. The composition of embodiment 87, wherein the fluorous agent is a perfluorinated-branched polyethylenimine polymer (F-bPEI); optionally, wherein the F-bPEI is dissolved in water and complexed to the genome editing-agent; and/or optionally, wherein the ratio of biological material to F-bPEI is about a 1:2 to 1:8 ratio by weight of genome-editing agent:F-bPEI.
90. The composition of any one of embodiments 87 to 89, wherein the genome-editing agent comprises a polynucleotide, optionally, wherein the polynucleotide is a guide RNA (gRNA) or a polynucleotide encoding a gRNA.
91. The composition of any one of embodiments 87 to 89, wherein the genome-editing agent comprises a polypeptide or a ribonucleoprotein.
92. The composition of embodiment 91, wherein the genome-editing agent comprises a ribonucleoprotein including at least one sequence-specific nuclease or a polynucleotide encoding a sequence-specific nuclease.
93. The composition of any one of embodiments 87 to 92, wherein the composition further comprises a stabilization compound that stabilizes the complex comprising the genome-editing agent and the fluorous agent.
94. The composition of embodiment 93, wherein the stabilization compound is a polysaccharide, a polyol, and/or a polyalcohol; optionally, wherein the polysaccharide is a disaccharide.
95. The composition of embodiment 94, wherein the disaccharide is alpha alpha-trehalose.
96. The composition of any one of embodiments 93 to 95, wherein the complex comprising the genome-editing agent and the fluorous agent has been stabilized with the stabilization compound and lyophilized prior to incorporation into the composition.
97. The composition of any one of embodiments 87 to 96, wherein the composition comprises the complex comprising the genome-editing agent and the fluorous agent in a liquid.
98. The composition of any one of embodiments 87 to 97, wherein the composition further comprises an ionic liquid.
99. The composition of embodiment 98, wherein the composition comprises an amount of about >0% to 50% by volume of the ionic liquid, of about >0% to 25% by volume of the ionic liquid, of about 5% to 50% by volume of the ionic liquid, of about 5% to 25% by volume of the ionic liquid, of about 10% to 50% by volume of the ionic liquid, of about 10% to 25% by volume of the ionic liquid,. of about 15% to 50% by volume of the ionic liquid, of about 15% to 25% by volume of the ionic liquid, or of about 15% to 20% by volume of the ionic liquid.
100. The composition of embodiment 98 or 99, wherein the ionic liquid comprises tetrabutylammonium acetate (TBAA); optionally, wherein the TBAA is in or provided in dimethyl sulfoxide (DMSO).
101. The composition of any one of embodiments 87 to 100, wherein the composition further comprises a surfactant, an enzyme, an abrasive, a solvent, a chelating agent, or a combination thereof.
102. The composition of any one of embodiments 87 to 101, wherein the genome-editing agent comprises a sequence-specific genome-editing agent.
103. The composition of embodiment 102, wherein the genome-editing agent is selected from the group consisting of a sequence-specific nuclease, a polynucleotide encoding a sequence-specific nuclease, a guide RNA (gRNA), a polynucleotide encoding a gRNA, and a ribonucleoprotein including at least one sequence-specific nuclease.
104. The composition of any one of embodiments 87 to 103, wherein the composition comprises an adjuvant selected from the group consisting of divalent cations and polyamines; optionally, wherein the divalent cation is $Ca^{2+}$ and/or $Mg^{2+}$; and/or optionally, wherein the polyamine is spermine, spermidine, or putrescine.

What is claimed is:
1. A method of delivering a biological material to the interior of a plant cell, the method comprising:
pre-treating the plant cell by contacting the plant cell with an ionic liquid comprising tetrabutylammonium acetate (TBAA);
contacting the pre-treated plant cell with a complex comprising the biological material and a fluorous agent without TBAA, wherein the fluorous agent does not consist of a perfluorocarbon, wherein the biological material is delivered to the interior of the plant cell, wherein the plant cell is a maize or wheat plant cell, and wherein the complex comprising the biological material and the fluorous agent is provided in a liquid, in micelles, or in an emulsion.

2. The method of claim 1, wherein the fluorous agent is $C_9H_5F_{150}$ (IUPAC 2-(trifluoromethyl)-3-ethoxydodecafluorohexane).

3. The method of claim 1, wherein the fluorous agent is a fluorinated-branched polyethylenimine polymer (F-bPEI).

4. The method of claim 1, wherein the biological material comprises a polynucleotide, a polypeptide, a small molecule, a ribonucleoprotein, or a combination of any thereof.

5. The method of claim 2, wherein the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$.

6. The method of claim 3, wherein the F-bPEI is dissolved in water and complexed to the biological material and/or wherein the ratio of biological material to F-bPEI is about a 1:2 to 1:8 ratio by weight of biological material: F-bPEI.

7. The method of claim 1, wherein the plant cell and/or a plant tissue comprising the plant cell is treated before, during, and/or after contact with the complex comprising the biological material and the fluorous agent with a chemical, mechanical, and/or enzymatic treatment.

8. The method of claim 1, wherein the biological material is a genome-editing agent and pre-treatment with the ionic liquid increases the efficiency of genome editing in comparison to a control without pre-treatment with the ionic liquid.

9. The method of claim 1, wherein the TBAA is in or provided in dimethyl sulfoxide (DMSO).

10. The method of claim 1, wherein prior to contacting the plant cell with the complex comprising the biological material and the fluorous agent, the complex comprising the biological material and the fluorous agent is stabilized with a stabilization compound comprising a polysaccharide, a polyol, and/or a polyalcohol; optionally, wherein the polysaccharide is a disaccharide.

11. The method of claim 10, wherein the stabilization compound is alpha, alpha-trehalose.

12. The method of claim 1, wherein the biological material comprises a sequence-specific genome-editing agent selected from the group consisting of a sequence-specific nuclease, a polynucleotide encoding a sequence-specific nuclease, a guide RNA (gRNA), a polynucleotide encoding a gRNA, and a ribonucleoprotein including at least one sequence-specific nuclease.

13. The method of claim 1, wherein the plant cell is a generative cell or a tube cell located in a pollen grain, and wherein the method further comprises germinating the pollen grain, and optionally contacting the resulting pollen tube with a stigma, stigma style, ovary, or ovum of a maternal plant, thereby resulting in fertilization of an egg of the maternal plant.

14. A composition comprising:

a) a plant cell pre-treated with an ionic liquid comprising tetrabutylammonium acetate (TBAA), wherein the plant cell is a maize or wheat plant cell; and b) a complex comprising a biological material and a fluorous agent, wherein the fluorous agent does not consist of a perfluorocarbon, and wherein the composition is without TBAA, optionally, wherein the biological material is a genome-editing agent, and/or optionally, wherein the composition comprises a liquid, micelles, or an emulsion.

15. The composition of claim 14, wherein the fluorous agent is $C_9H_5F_{15}O$(IUPAC 2-(trifluoromethyl)-3-ethoxydodecafluorohexane).

16. The composition of claim 14, wherein the fluorous agent is a fluorinated-branched polyethylenimine polymer (F-bPEI).

17. The composition of claim 14, wherein the biological material comprises a polynucleotide, a polypeptide, a small molecule, ribonucleotide, or a combination of any thereof.

18. The composition of claim 15, wherein the complex further comprises a fluoro-surfactant comprising alternating polyethyleneglycol (PEG) and polytetrafluoroethylene (PTFE) co-block polymer at a mass ratio of at least about 1% in the $C_9H_5F_{15}O$.

19. The composition of claim 16, wherein the F-bPEI is dissolved in water and complexed to the biological material and/or wherein the ratio of biological material is about a 1:2 to 1:8 ratio by weight of biological material: F-bPEI.

20. The composition of claim 14, wherein the composition further comprises a surfactant, an enzyme, an abrasive, a solvent, a chelating agent, a stabilization compound, or a combination thereof.

21. The composition of claim 14, wherein the TBAA is in or provided in dimethyl sulfoxide (DMSO).

* * * * *